United States Patent [19]
Ricciardi et al.

[11] 4,320,855
[45] Mar. 23, 1982

[54] WEIGH FEEDING APPARATUS

[75] Inventors: Ronald J. Ricciardi, Garfield; Angelo Ferrara, Fairfield; Joseph L. Hartmann, West Caldwell; Gary R. Lauterbach, Livingston, all of N.J.

[73] Assignee: Acrison, Incorporated, Moonachie, N.J.

[21] Appl. No.: 125,370

[22] Filed: Feb. 28, 1980

Related U.S. Application Data

[63] Continuation of Ser. No. 907,960, May 22, 1978, which is a continuation of Ser. No. 748,397, Dec. 7, 1976, Pat. No. 4,111,272.

[51] Int. Cl.³ .................. B67D 5/08; G01G 19/52; G01G 23/10; G06F 15/20
[52] U.S. Cl. ..................... 222/56; 222/77; 222/58; 177/50; 177/185; 364/479
[58] Field of Search ............ 222/55, 58, 63, 56; 177/50, 185; 364/479

[56] References Cited
U.S. PATENT DOCUMENTS

| Re. 27,115 | 4/1971 | Goff et al. | 222/58 |
| 2,984,386 | 5/1961 | White | 222/58 |
| 3,329,313 | 7/1967 | Mayer | 222/58 |
| 3,481,509 | 12/1969 | Marhauer | 222/58 X |
| 3,511,412 | 5/1970 | Wolfenden et al. | 222/58 |
| 3,532,253 | 10/1970 | Godwin | 222/58 |
| 3,565,194 | 2/1971 | Engle et al. | 177/50 |
| 3,855,458 | 12/1974 | Motter et al. | 222/55 |
| 3,889,848 | 6/1975 | Ricciardi et al. | 222/58 |
| 3,967,758 | 7/1976 | Ferrara | 222/58 |
| 4,054,784 | 4/1976 | Ricciardi et al. | 222/58 X |
| 4,102,421 | 7/1978 | Ozaki et al. | 177/185 |

FOREIGN PATENT DOCUMENTS 1186175  1/1965  Fed. Rep. of Germany.

Primary Examiner—George H. Miller, Jr.
Attorney, Agent, or Firm—Davis, Hoxie, Faithfull & Hapgood

[57] ABSTRACT

Disclosed herein is an automatically controlled weigh feeding apparatus including a container for prefilling with a substance, a device for discharging the substance from the container at a controllable rate, apparatus for weighing the substance being discharged and for producing an electrical signal proportional to that weight, a voltage to frequency converter connected to receive the electrical signals, a digital computer, apparatus coupled to an output of the voltage to frequency converter for inputting data signals to the digital computer, the computer being adapted to compute a corrective signal based on the input data signals received, and coupling apparatus coupled between the computer and the device for discharging the substance from the container for controlling the rate of discharge responsive to the corrective signal.

36 Claims, 20 Drawing Figures

FIG. 19
SUBROUTINE DESCRIPTION $D_{IN}$: GATHERS DATA FROM FRONT END, STORES IN R1 AND R2

$D_{OUT}$: OUTPUTS MOTOR SPEED $I_{NIT} A$: SETS UP MAXFEED RATE, INTERNAL GRAV. SET $I_{NIT} B$: RESPONSE TIME (SECONDS)

$I_{NIT} C$: ACRILOK BAND $I_{NIT} D$: SYSTEM GAIN $I_{NIT} E$: PRESET TOTAL $I_{NIT} F$: PROD. DENSITY, HIGH LEVEL, LOW LEVEL, HOPPER SIZE, MAX. SCALE WEIGHT, CHAMBER SIZE $I_{NIT} G$: DISPLAY RATE (IN SECONDS)

$I_{NIT} H$: VOLUMETRIC SET POINT

ENTERESTORE: PUTS VALUES INTO CIRCULAR BUFFER TO BE USED BY "PRINTRESTORE" FOR RESTORATION FROM PRIORITY MESSAGE

PRINTRESTORE: PRINTS CIRCULAR BUFFER

MAINPRINT - PRINTNUM: PRINTING ROUTINES

WEIGH FEEDING APPARATUS

This is a continuation of application Ser. No. 907,960, Filed May 22, 1978, which is a continuation of Ser. No. 748,397, Dec. 7, 1976 now U.S. Pat. No. 4,111,272.

BACKGROUND OF THE INVENTION

This invention relates to feeding systems and it is particularly applicable to apparatus for feeding fluid-like material. Systems constructed according to the present invention are particularly adapted, among other possible uses, for accurately feeding a wide variety of substances including dry materials regardless of whether the material is free-flowing, sluggish, or pressure sensitive; and ranging from amorphous powders to flakes, pellets, chunks and even fibers, as well as liquids.

Various control weigh feeding systems have been known in the past, as for example, the system disclosed in U.S. Patent Application Ser. No. 345,587, filed Mar. 28, 1973, which has issued as U.S. Pat. No. 3,889,848. In accordance with this application, there is provided a weigh feeding apparatus wherein the discharge rate of a fluid substance from a container is maintained at a predetermined constant value. The container and its contents are weighted, and an electrical signal is produced which signal has an amplitude proportional to the weight of the container and its contents. This electrical signal, which varies as the contents of the container are discharged, is differentiated and applied to a comparator circuit together with a reference signal, wherefore the output of the comparator circuit may be used to control said discharge rate of the substance as it is fed from the container. The comparator output is applied to a signal generator for producing a motor drive signal for a DC motor having its output shaft connected to drive a device for discharging the substance from the container. The signal generator may comprise a pulsing circuit for controlling a pair of SCR's which are disposed in a rectifying bridge circuit connected between an AC voltage source and the input of the DC motor. Accordingly, the speed of the motor is controlled by the pulsing circuit, which, in turn, is controlled by the algebraic sum of the output signal of a tachometer generator which is coupled directly to the motor shaft, and output signal from the comparator. It can be stated that the above-described apparatus provides an accurate weigh feeding system, whereby the feeding rate may be maintained at a constant value, and wherein the predetermined feeding rate may be adjusted by adjusting the value of the reference signal source.

Additionally, the output of the weighing device may be applied to a pair of differential amplifier circuits, along with a pair or reference voltage inputs, for determining when the contents of the container varies above and below desired maximum and minimum fill levels for the container. That is, circuitry is provided for automatically refilling the container when the weight of the substance therein reaches the desired minimum weight, and for terminating the filling process for the container when the fluid substance therein reaches the desired maximum weight. Such circuitry includes means for maintaining the discharge rate of the container at a constant rate equal to the instantaneous rate thereof immediately preceding energization of the filling device for the container. Particularly, the pair of differential amplifier circuits are coupled to a pair of relay driver circuits for controlling a relay circuit to energize the filling device when the substance in the container reaches the minimum weight, and for maintaining that filling device in an energized state until the container is refilled to its maximum desired level. The relay circuit is also coupled to the comparator circuit, for controlling the latter to produce a constant output during the refilling process for the container, thereby maintaining the discharge rate of the container at the value of the particular discharge rate thereof immediately preceding energization of the filling device.

As pointed out in said U.S. Pat. No. 3,889,848 in certain installations there exists a possibility of physical forces impinging upon the weigh feeder from an external source, such as wind or air currents, physical contact with the weigh feeder by operating personnel, or the like, for example. These forces cause the weigh feeder to move at a rate that is other than that resulting from the linear discharge of the contents of the container. Because such additional movement, i.e. acceleration, is an error and has no direct relationship to the actual discharge of material from the container, the control system could continue to perform its corrective function utilizing the erroneous output signal for comparison with the fixed set point reference signal derivative. The aforementioned patent discloses one means for preventing such excessive and adnormal movements of the weigh feeder scale from grossly affecting or disturbing the normal operation of the system to thereby prevent large excursions of the output feed rate.

Disclosed in our patent application, Ser. No. 678,391, which has issued as U.S. Pat. No. 4,054,784, in one form thereof, is a new and improved weigh feeding apparatus characterized by a container for a prefilled substance having means for discharging the substance therefrom at a controllable rate. A scale system is provided for weighing the container prefilled with the substance and an electrical circuit serves to produce a first electrical signal proportional in amplitude to the weight, and a high gain amplifier amplifies the electrical signal. An analog-digital converter (ADC) is coupled to the amplifier and a digital computer is adapted to receive pulse signals from the ADC for computing and outputting a signal corresponding to the signal received. Digital-analog converter ramp offset means which is controlled by the computer outputs a controlled stepping signal, that is applied as a second input to the amplifier means to algebraically combine therewith. Each step corresponds to one time cycle of operation, thereby maintaining the output of the amplifier in a given preselected range of amplitude during one time cycle of operation. The digital computer as another operation thereof computes a corrective signal based on the signals received, and means coupled between the computer and the means for discharging the substance from the container, serve to control the rate of discharge responsive to the corrective signal.

SUMMARY OF THE INVENTION

The present invention is directed to new, improved means for accomplishing the foregoing objectives, as well as additional objectives, as will become apparent as the description proceeds.

One of the features of the present invention resides in the provision of a new and improved weigh feeder system, which is capable of controlling more operating parameters, which operates faster, which provides a faster responsive action, and which is more accurate as compared to the prior art systems. In addition, the feeder system of the present invention has a memory and is capable of taking into account past errors in the material flow rate and taking corrective action with respect thereto.

Also, the system is capable of disregarding single or multiple extraneous material flow rate readings, which may be caused by such factors as noise, vibrations, or the like, for example.

To the accomplishment of the foregoing and other objectives, the invention contemplates the provision of a new and improved weigh feeder apparatus, which comprises a container for prefilling with a substance, and means for discharging the substance from the container at a controllable rate. Means are provided for weighing the substance being discharged, and means coupled thereto serve to produce electrical signals proportional in amplitude to the weight determined. A voltage to frequency converter, which receives the electrical signals, is coupled by electrical circuitry to a digital computer for inputting data signals thereto. The digital computer is adapted to compute a corrective signal based on the input data signals received, and means are coupled between the computer and the means for discharging the substance from the container for controlling the rate of discharge responsive to the corrective signal.

In one form of the invention, the means for weighing the substance being discharged comprises a scale for weighing the container prefilled with the substance, and in another form thereof the means for weighing the substance being discharged comprises a moving belt conveyor wherein the entire belt and its contents are weighed. In a third form the means for discharging the substance comprises a volumetric type auger feeder wherein the entire auger feeder and its contents are weighed.

According to one aspect of the invention, the weighing means are connected to the voltage to frequency converter by a linear variable differential transformer and a differential DC amplifier circuit.

In one embodiment of the invention, the means coupled to an output of the voltage to frequency converter for inputting data signals to the digital computer includes a first gating circuit, means coupling this gating circuit to the voltage to frequency converter, and a second gating circuit with an oscillator coupled thereto. A first logic circuit is provided for receiving information from the computer for selecting a predetermined time base period, and means are provided for coupling this logic circuit to the gating circuits for enabling them. A first counter is connected to the output of the first gating circuit and a second counter is coupled to the output of the second gating circuit. A second logic circuit is provided for receiving information from the computer for selecting a predetermined number of periods to be passed through the first gating circuit. A comparator is interposed between the first counter and the second logic circuit for determining when the first counter has counted the predetermined number of periods. A bit data latch or register is connected to an output of the second counter, and means responsive to the comparator are provided for enabling the bit data latch to receive bits of data from the second counter and to disenable the gating circuits and to reset the first and second counters the counter means. In addition, means are provided for connecting an output of the bit data latch to the digital computer. According to an aspect of the invention, the means coupling the first logic circuit to the gating circuits for enabling these circuits includes a time base generator driven by the oscillator.

Further, in a form thereof, the invention includes means for inputting into the digital computer a preselected feed rate. The computer has programmed therein a calculation time cycle and is adapted to store in memory a series of data signals received for each calculation time cycle and computing the corrective signal by comparing the signals received with the preselected feed rate. The computer is adapted to maintain said corrective signal constant during the time when a preselected number of the signals received exceeds preselected upper of lower limits during one calculation time cycle. Further, the computer is provided with means for correcting the data signals received to compensate for errors due to extraneous noise.

In still another form of the invention, the digital computer is adapted to store in memory a series of data signals received for each of the calculation time cycles and to compute the slope of the actual feed line during each such calculation time cycle. It also compares the computed slope during each time cycle with the computed slope for the last preceeding calculation time cycle, and determines the percentage variation therefrom, and if the variation is within a predetermined range it proceeds to compute the corrective signal corresponding to the variation, and if the variation is in excess of the predetermined range it maintains the corrective signal constant.

According to another aspect of the invention, there is provided under-weight limit input means and over-weight input means to the digital computer, and the computer is adapted to actuate an alarm when the data signals received by the computer exceed one of said limits. The computer may also be adapted to integrate the preselected feed rate with respect to time and output a display corresponding to the desired total feed commanded, and to integrate the actual total weight of material fed as determined by the data signals received and, by comparing said total feed commanded to the actual weight of material fed, adjust said corrective signal.

In accordance with other forms of the invention, means are provided for operating the system in a volumetric mode, and means are provided for automatically refilling the supply container to maintain the supply of material therein within preselected upper and lower limits.

These features of the invention have been outlined in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other structures for carrying out the various purposes of the invention. It is important, therefore, that this disclosure be regarded as including such equivalent constructions and methods as do not depart from the spirit and scope of the invention.

Several embodiments of the invention have been chosen for purposes of illustration and description, and are shown in the accompanying drawings forming a part of the specification, wherein.

Figure 1:
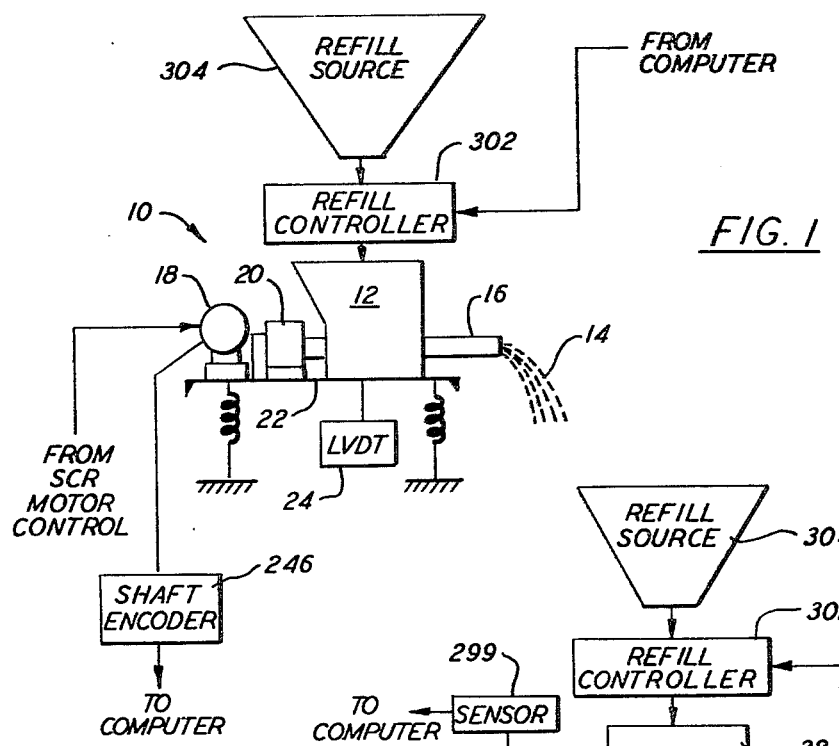
FIG. 1 is a schematic side elevation and block diagram of a weigh feeder assembly according to one embodiment of the invention.
Figure 2:
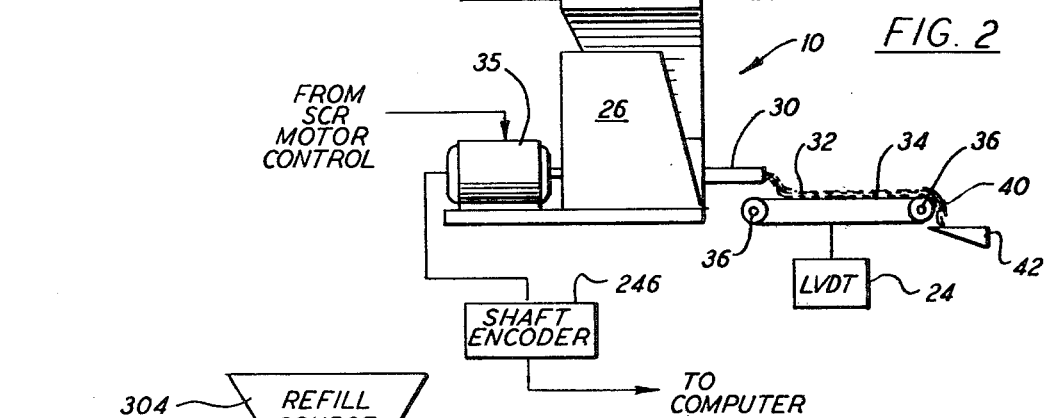
FIG. 2 is a schematic side elevation and block diagram similar to FIG. 1, but showing another embodiment of a weigh feeder assembly.
Figure 3:
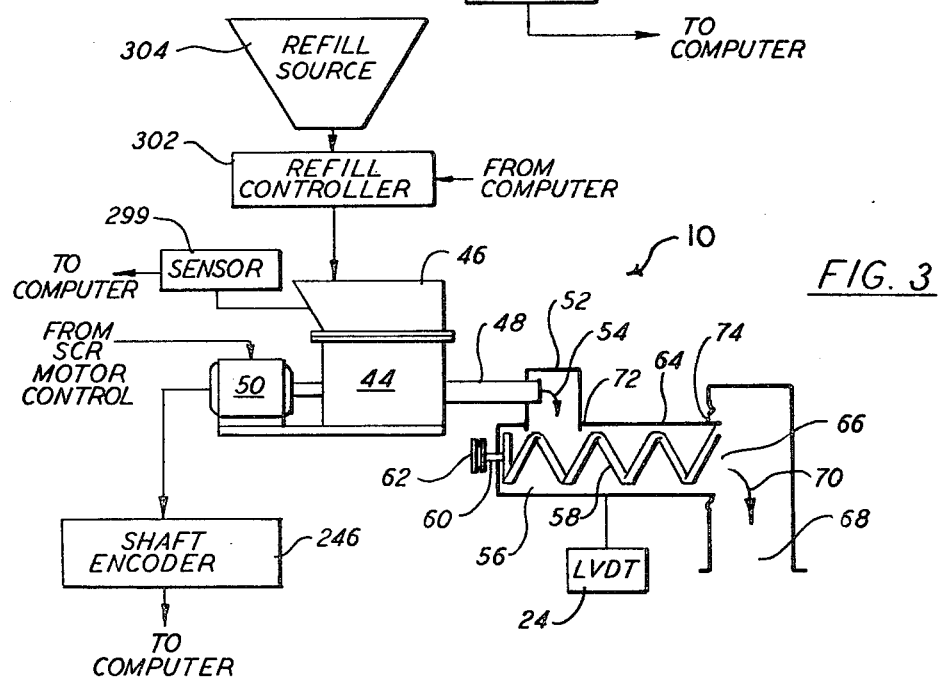
FIG. 3 is a schematic side elevation and block diagram similar to FIGS. 1 and 2, but showing still another embodiment of a weigh feeder assembly.
Figure 4A:
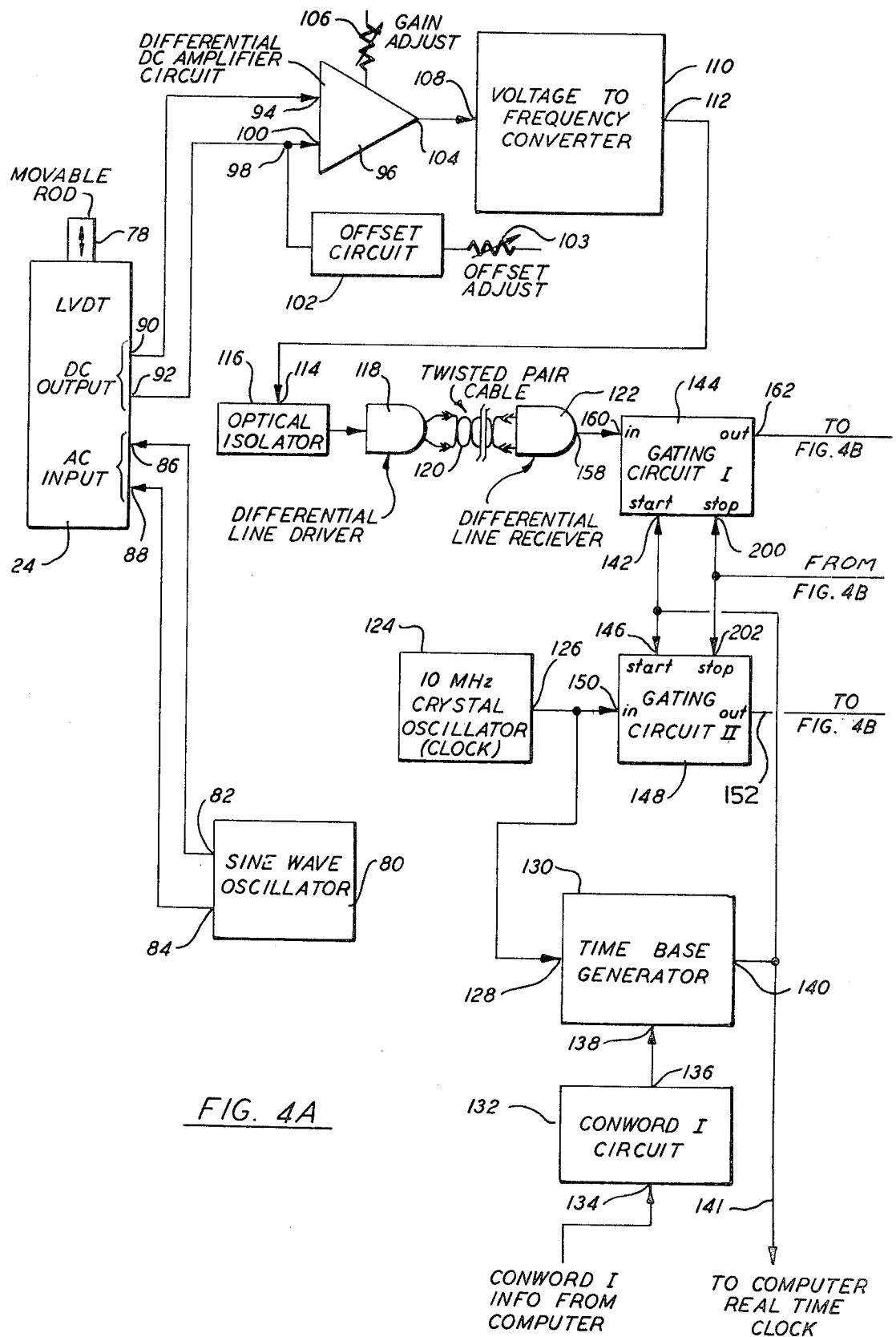
Figure 4B:
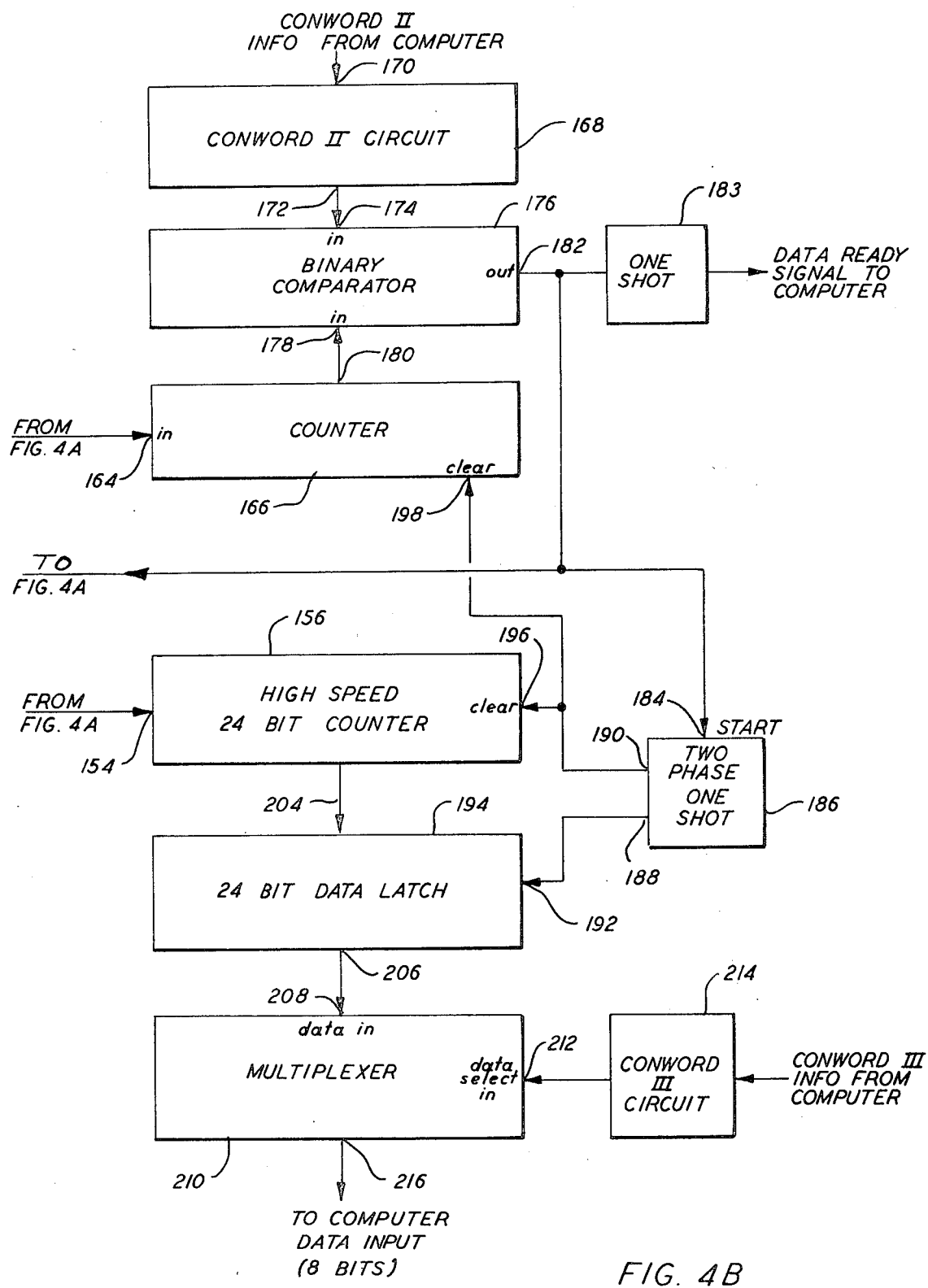
Figure 5:
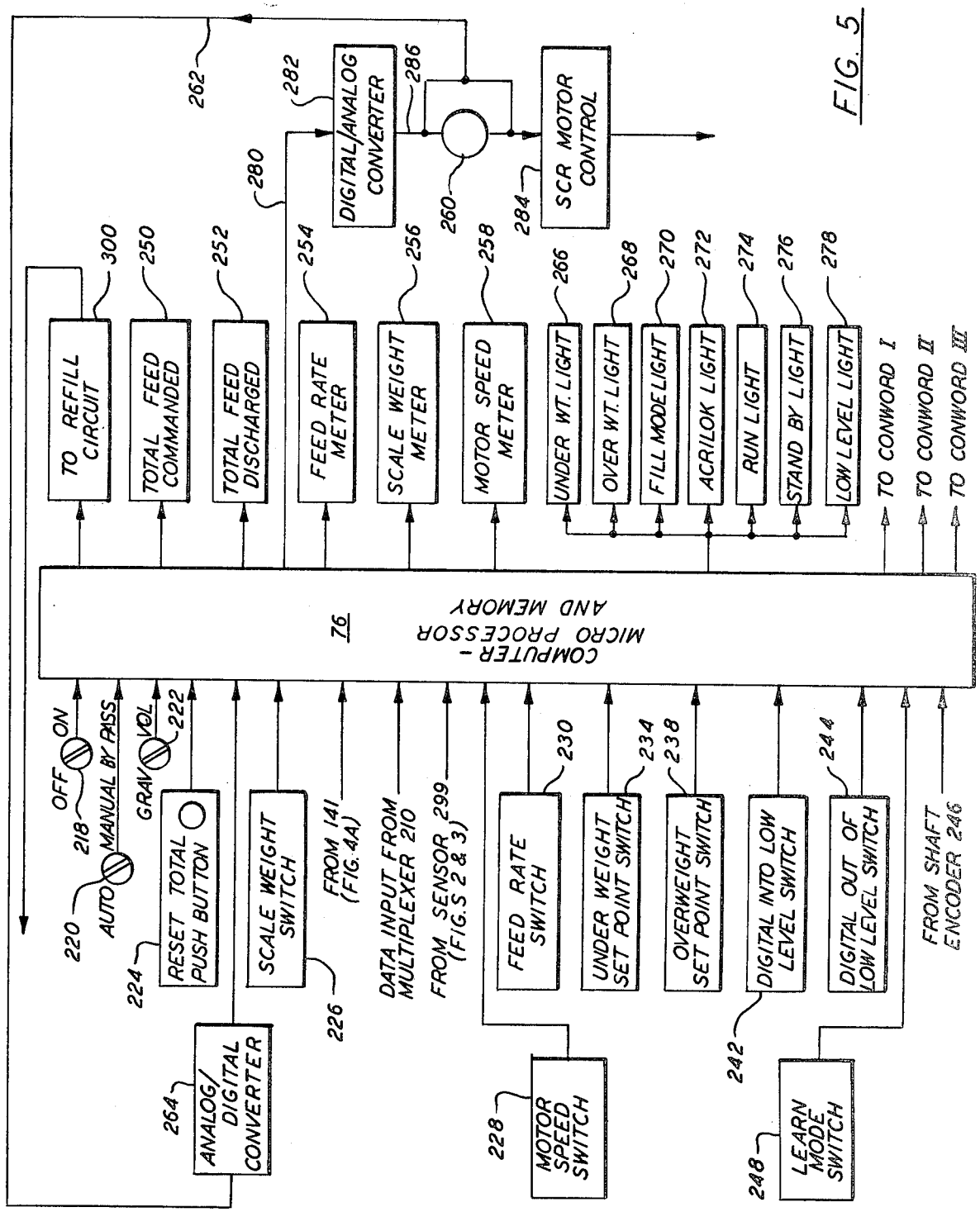
Figure 6:
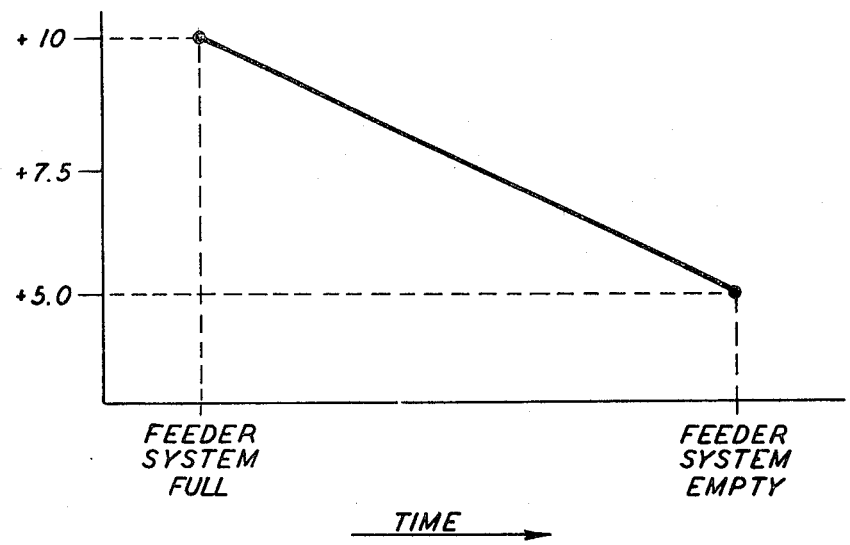
Figure 7:
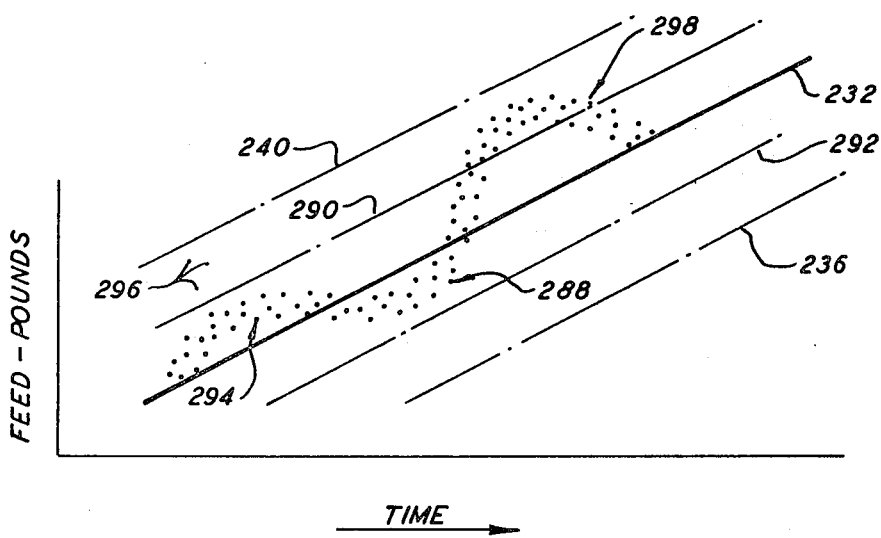
Figure 8:
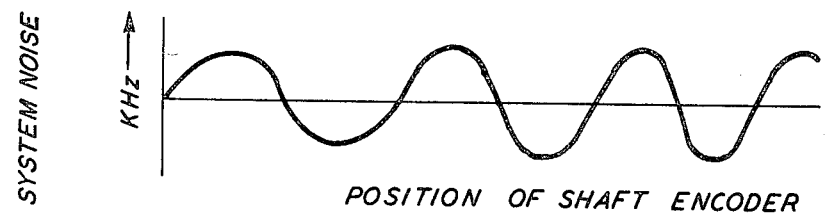
Figure 9:
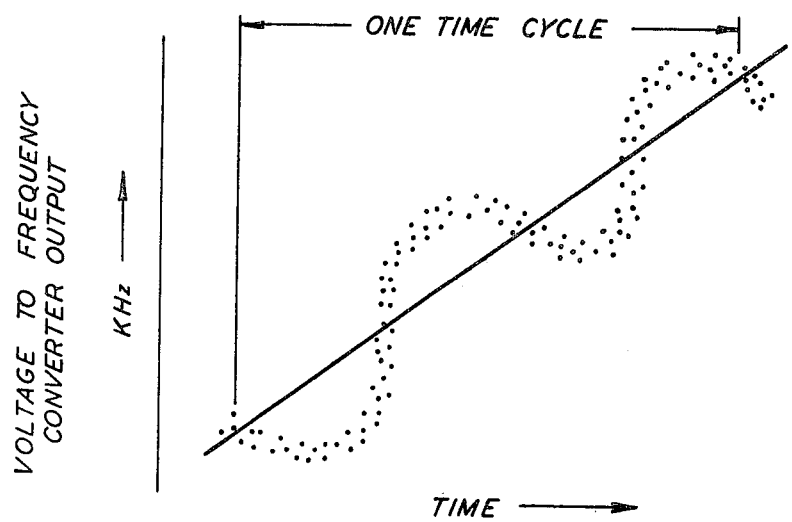
Figure 10:
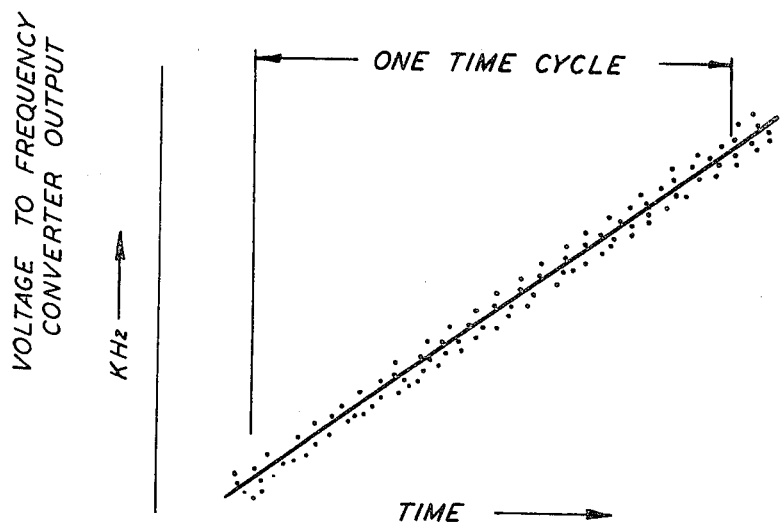
Figure 11:
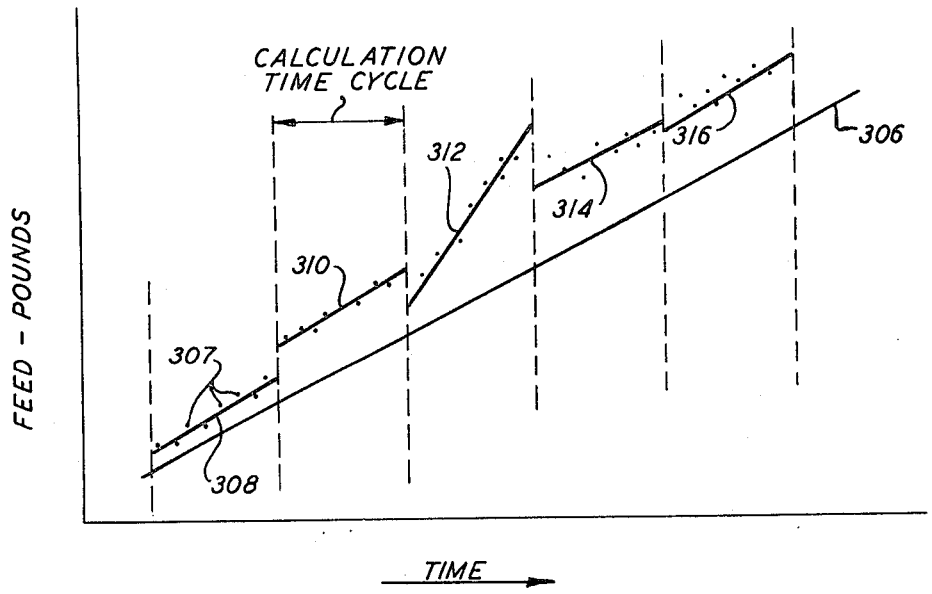
Figure 12:
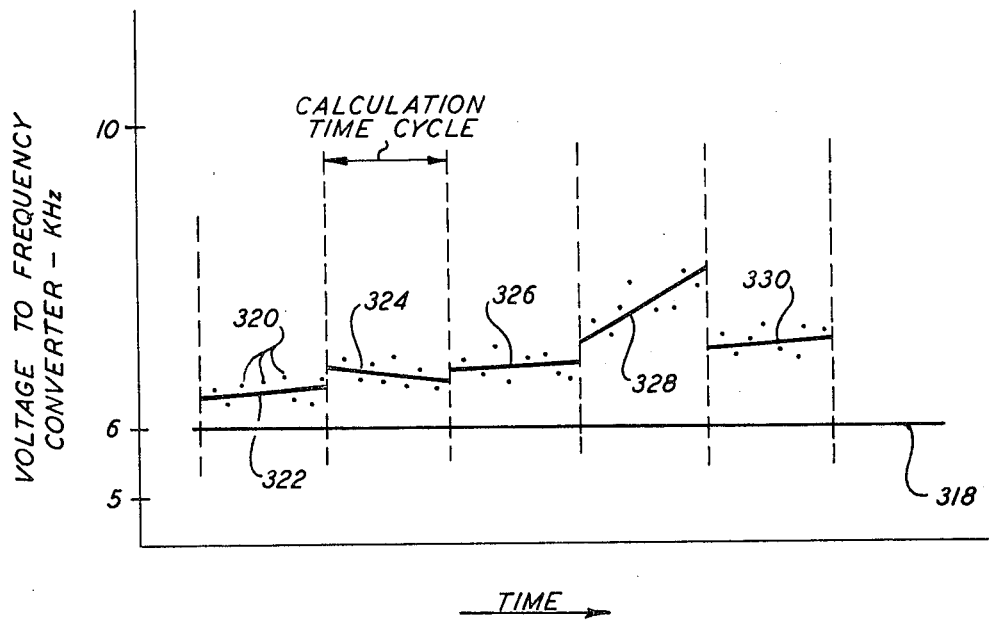
Figure 13:
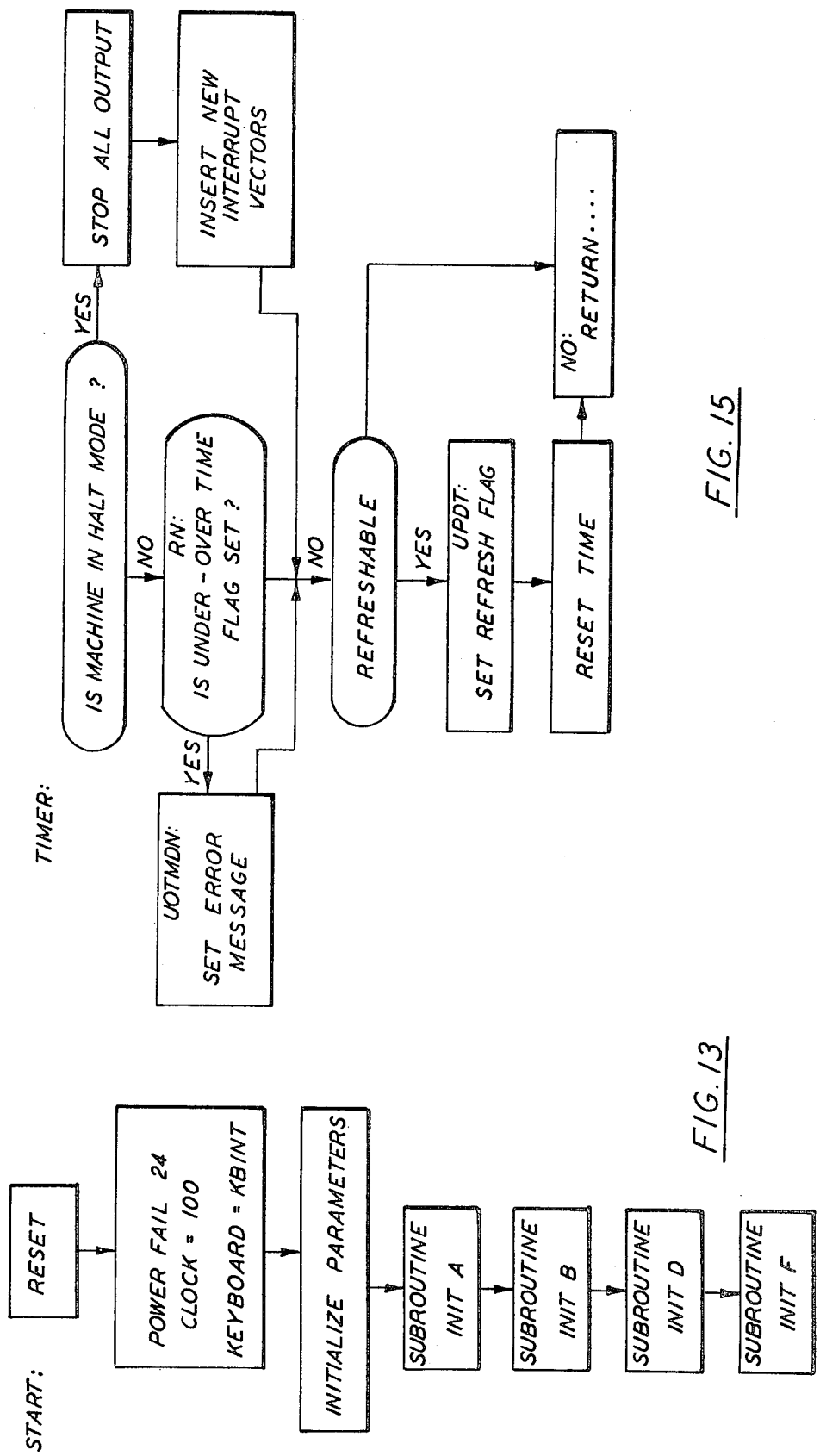
Figure 14:
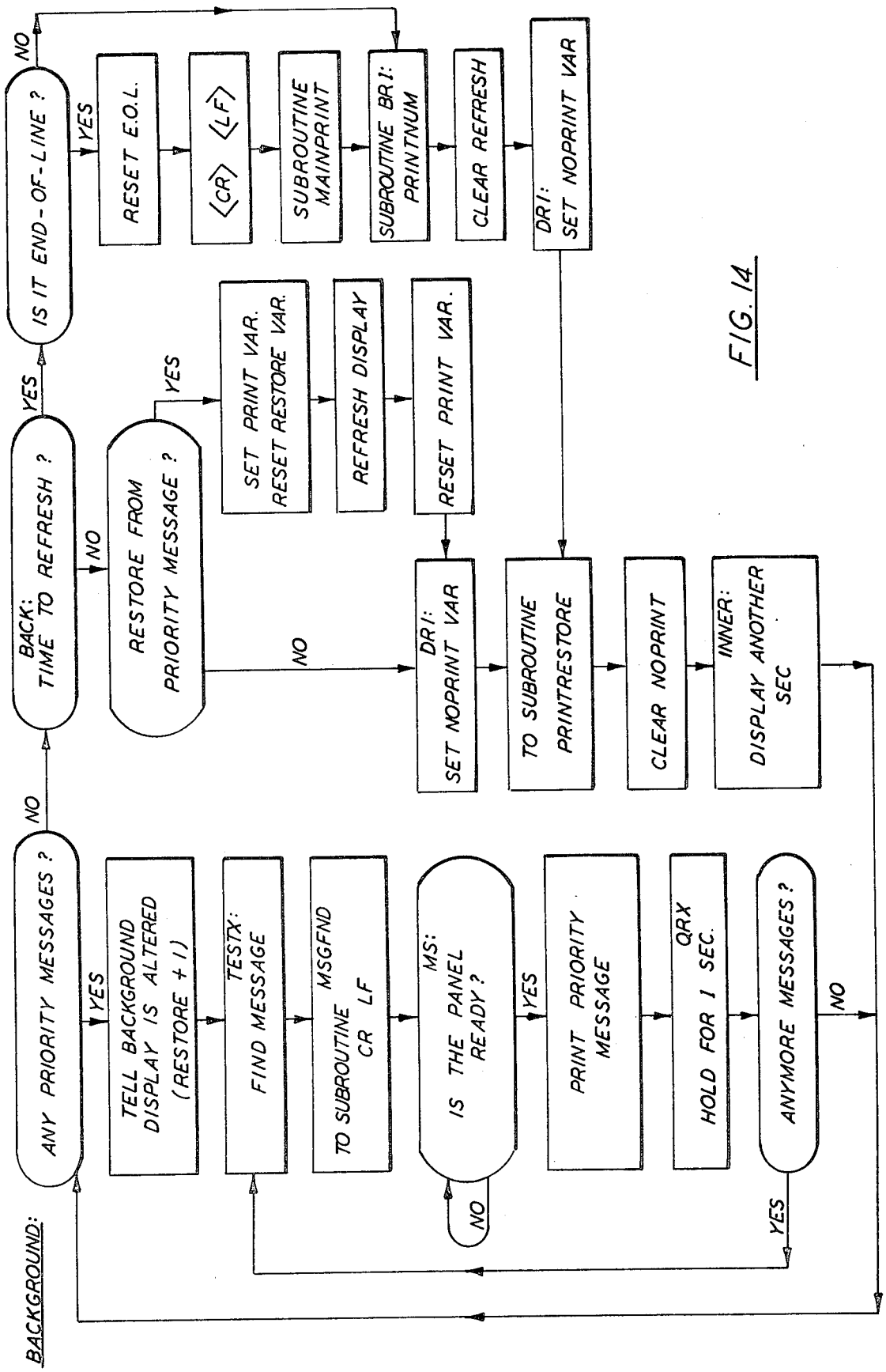
Figure 16:
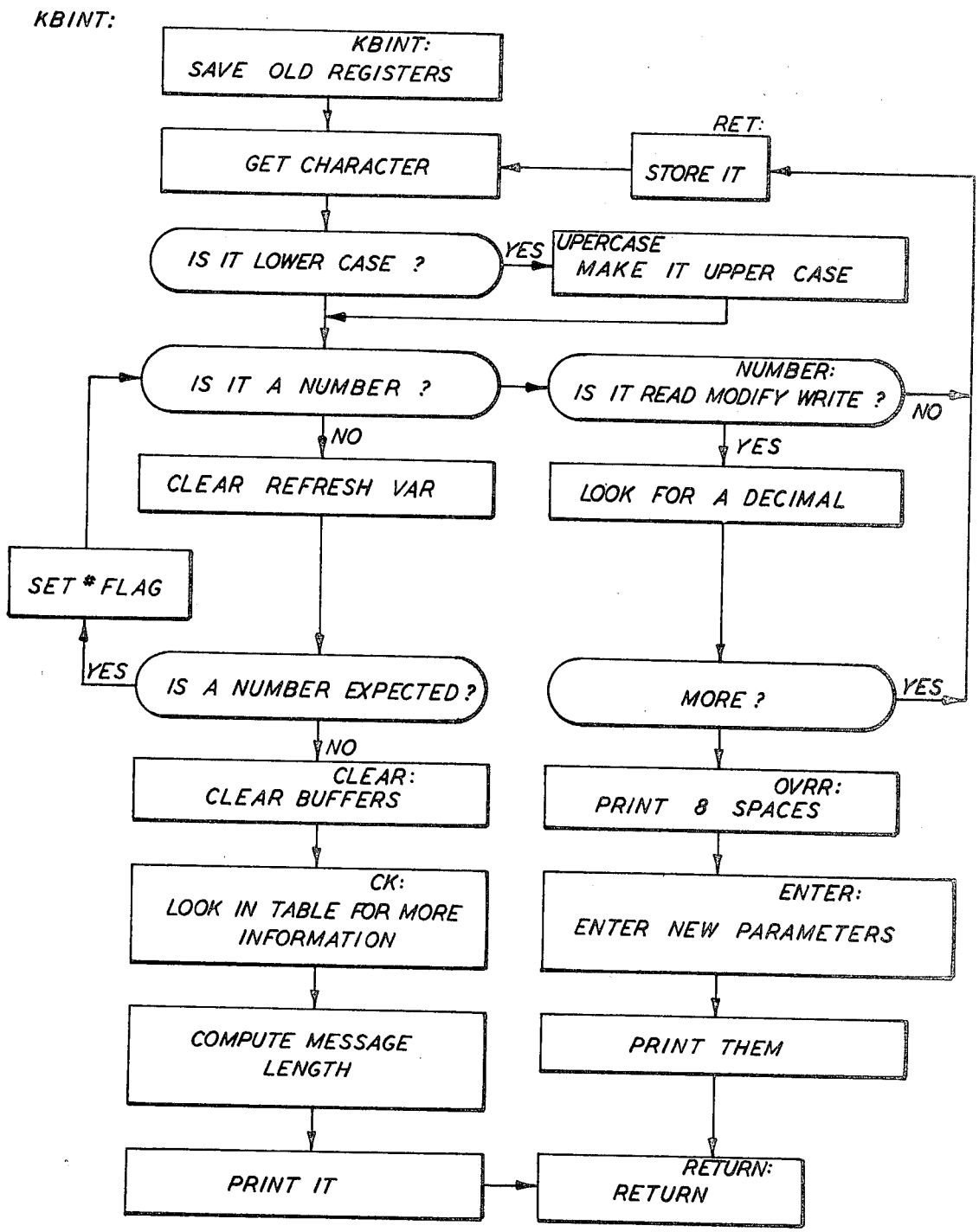
Figure 17:
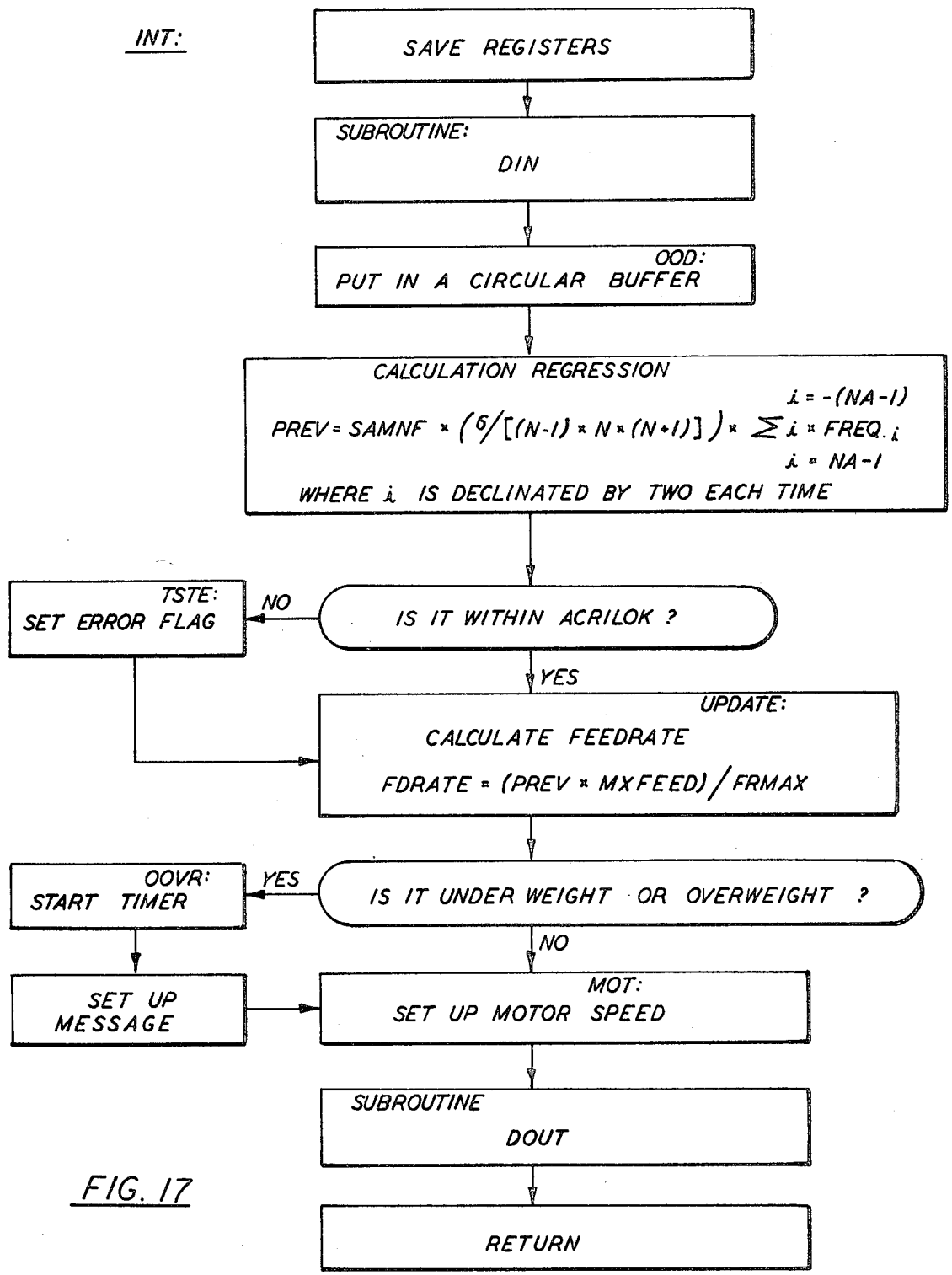
Figure 18:
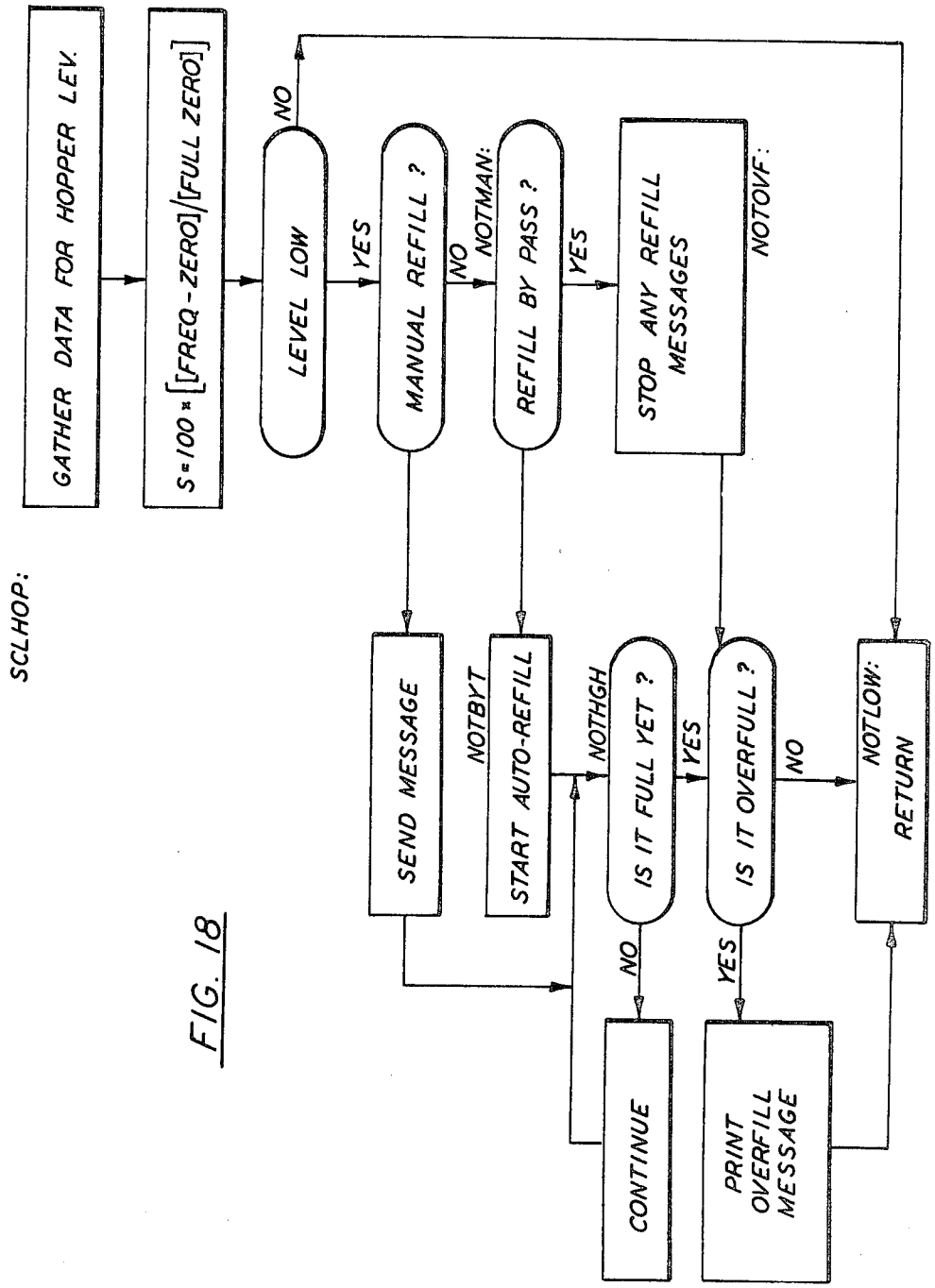

FIGS. 4A and 4B cooperate to form a block diagram of the interface circuitry for coupling any one of the feeder assemblies of FIGS. 1 to 3 to a computer or micro processor;

FIG. 5 is a block diagram of the inputs and outputs of the computer or micro processor according to the invention;

FIG. 6 is a graphic representation of the output voltage which respect to time of the differential amplifier circuit of the present invention;

FIG. 7 is a graphic representation of the actual measured feed curve as compared to the desired feed curve, using the feeder assembly of FIG. 1;

FIG. 8 is a graphic representation of the positional relationship of the shaft encoder with respect to the system noise;

FIG. 9 is a graphic representation of the output of the voltage to frequency converter with respect to time, before it is corrected for the induced system noise;

FIG. 10 is a graphic representation of the output of the voltage to frequency converter with respect to time, after it has been corrected for the induced system noise;

FIG. 11 is a graphic representation of the actual measured feed curve as compared to the desired feed curve similar to FIG. 7, but illustrating another mode of programming the computer;

FIG. 12 is a graphic representation of the actual measured feed curve as compared to the desired feed curve using the feeder assemblies of either FIG. 1 or FIG. 2;

FIG. 13 is a flow chart showing the program start;

FIG. 14 is a flow chart of the background;

FIG. 15 is a flow chart of the timer routine of the computer;

FIG. 16 is a flow chart of the keyboard interrupts;

FIG. 17 is a flow chart of the calculation routine;

FIG. 18 is a flow chart for computing the scale weight and hopper level; and

FIG. 19 is a chart specifying the subroutine description.

In the embodiment of the invention shown in FIG. 1, there is illustrated diagrammatically a feeder assembly indicated generally at 10, which comprises a container 12 with a discharge device connected thereto for feeding a substance 14 from the container through a discharge conduit 16. As illustrated, a variable speed DC motor 18, connected to a gear-reduction device 20, is provided for driving the discharge device. The feeder assembly may comprise an auger mechanism as disclosed in detail in U.S. Pat. No. 3,186,602 issued June 1, 1965. The entire feeding assembly, including the container, the discharge device, the motor, and the gear-reduction device is mounted on a scale 22, which may comprise a structure as decribed in detail in U.S. Pat. No. 3,494,507, issued Feb. 10, 1970.

In accordance with the invention, there is provided a detecting device, as for example, a linear variable differential transformer (LVDT) 24, coupled to the scale for providing an electrical signal having an amplitude which is proportional to the weight of the container and its contents. That is, as the contents of the container 12 are discharged, a relative movement occurs between the windings and the core of the LVDT, thereby causing a varying output voltage proportional to the varying weight of the container and its contents. Thus, as the substance is discharged from the container, the LVDT provides an electrical signal which varies in response to such discharge, which may, for example, be a DC voltage with a range of the order of from about plus or minus 3 volts to about plus or minus 6 volts when the material in the container drops from its upper level to its lower level.

In the embodiment of the invention illustrated in FIG. 2, there is provided a feeder assembly indicated generally at 10 which comprises a volumetric type feeder 26 having an upper inlet 28 for receiving material to be processed and a lower dispensing outlet 30 for dispensing the material 32 onto a conveyor belt 34. A variable speed DC motor 35 is provided for driving the discharge device. A suitable type of volumetric feeder for this purpose is described in detail in the aforesaid U.S. Pat. No. 3,186,602.

The conveyor belt 34 is carried by a pair of spaced rollers 36, one of which is driven by drive means, such as a constant speed motor and chain drive, for example (not shown). The rollers are mounted on a conveyor support frame, not shown. In operation the material 32 passes from the feeder 26 through the outlet 30 to the conveyor belt 34 and is discharged therefrom as at 40 into a receiving hopper or container 42. Suitable scale means for the conveyor belt are described in detail in the aforesaid U.S. Pat. No. 3,494,507. Thus, the conveyor belt 34 is mounted in such a manner that the entire belt and its contents can be "sensed" or weighed by a force sensing load cell, such as the LVDT 24, described hereinbefore in connection with the embodiment of FIG. 1.

In the embodiment of the invention illustrated in FIG. 3, there is provided a feeder assembly indicated generally at 10, which also comprises a volumetric auger type feeder 44, having an upper inlet 46 for receiving material to be processed and a lower enclosed dispensing outlet 48. A particularly suitable type of volumetric feeder for this purpose is described in detail in the aforesaid U.S. Pat. No. 3,186,602. The feeder 44 employs an auger (not shown) driven by a motor 50 for propelling the material through the outlet 48 into a downspout 52, as indicated by arrow 54. The dispensing outlet and the downspout are mounted in fixedly sealed relationship with respect to each other. The downspout leads to the inlet of an enclosed auger type conveyor 56, which incorporates an auger 58 having a drive shaft 60 driven at substantially constant speed by a motor, not shown, through a chain and pulley system 62. The auger 58 serves to move the material through a conveyor cylinder 64 to a fixedly mounted discharge outlet 66 where it passes into a discharge conduit 68, as indicated by arrow 70. The movable conveyor cylinder 64 is flexibly connected in sealed relationship to the fixed downspout 52, as by means of a downspout sleeve 72. In addition, the movable cylinder 63 is flexibly connected in sealed relationship to the fixed discharged conduit 68, by means of a sleeve clamping assembly 74. Accordingly, it will be appreciated that the material being processed passes through a completely closed system from inlet to outlet. A particularly suitable system of this type is described in detail in U.S. Pat. No. 3,804,298 issued Apr. 16, 1974. The conveyor 64 is mounted in a scale-like manner so that the entire conveyor assembly and its contents, but not including conduits 48 or 68, or the equipment feeding those conduits, can be "sensed"

or weighed by a force sensing load cell, such as the LVDT 24, described hereinbefore in connection with the embodiment of FIG. 1.

In the embodiments illustrated in FIGS. 1, 2 and 3, the feeder assemblies 10, having containers and discharge conduits for all types of substances, are particularly suitable for solid particles, but it is to be understood that the combinations described above may also be used for controlling the discharge of liquid substances from the containers, wherefore the augers would be replaced by pumps.

Referring next to FIGS. 4A and 4B, there is shown interface circuitry for coupling the feeder assembly 10 to a micro processor and memory or computer 76. It will be appreciated that any one of the feeder assemblies 10 of the embodiments of FIGS. 1-3 may be employed with this interface. The LVDT 24, FIG. 4A, is provided with a rod 78, which is movable in response to the weight being measured. A sine wave oscillator 80, which may, for example, comprise a Burr-Brown Model No. 8692-1001, has outputs 82 and 84 which are coupled to inputs 86 and 88 of the LVDT for applying an AC input thereto. The LVDT has outputs 90 and 92, the output 90 being coupled to an input 94 of a differential DC amplifier circuit 96 and the output 92 being connected to a summing junction 98 which, in turn, is connected to an input 100 of the differential DC amplifier circuit 96. Also, applied to the summing junction 98 is an offset circuit 102 controlled by an offset adjust 103. In addition, the amplifier circuit 96 is provided with a gain adjust 106. In the embodiments illustrated, the LVDT signal, which is a DC signal between about minus 3 and plus 3 volts depending on the position of the movable rod 78, is fed into the differential DC amplifier 96 along with the offset voltage. The offset adjust and the gain adjust set the output 104 from the amplifier circuit for plus 5 volts when the portion of the feeder system 10 mounted on the scale is empty and for plus 10 volts when the feeder system is full, as shown in FIG. 6. Any suitable amplifier circuit may be employed such as two Model OPO5EJ units, as manufactured by Precision Monolithics, Inc. for example. The first unit is a differential amplifier circuit, which is followed by a variable gain single-ended amplifier circuit. The output 104 of the amplifier circuit 96 is coupled to an input 108 of a voltage to frequency converter 110, which outputs a corresponding pulse train output at 112 of from 5 KHz to 10 KHz. It will be appreciated that the embodiment of FIG. 1 is a weight loss system wherein the weight on the scale as sensed by the LVDT gradually diminishes until the container 12 is empty, and thus the pulse train output gradually moves from 10 KHz to 5 KHz. On the other hand, in the embodiments of FIGS. 2 and 3, the weight on the scale as sensed by the LVDT remains substantially constant so that the output of the voltage to frequency converter 110 also remains constant. That is, if the frequency outputted is at 5 KHz then the rate of flow would be zero, and if the frequency is 10 KHz then the rate of flow would be maximum. In normal operation, the frequency outputted would be at a substantially constant value somewhere therebetween, such as at 6 KHz, for example. The voltage to frequency converter may be a Burr-Brown Model VFC-12, for example. The pulse train is fed to the input 114 of an optical isolator 116 which may comprise, for example, a Monsanto Corporation Model No. MCL600. The optical isolator 116 outputs to a differential line driver 118, which drives a twisted pair cable 120. The pulse train is received by a differential line receiver 122 coupled to the twisted pair cable.

A 10 MHz. crystal oscillator, or clock, 124 has an output 126 coupled to an input 128 of a time base generator 130 for driving the time base generator. Conword I circuit 132, which includes logic circuitry, has an input 134 for receiving programmed information from the computer 76 and an output 136 coupled to an input 138 of the time base generator for selecting a particular time base period, and responsive thereto the time base generator generates a selected time period, i.e. 1, 0.5, 0.25, or 0.125 seconds the start of which is gated by a signal from the 10 MHz oscillator. This time base generator has an output 140 which is coupled to a start input 142 of gating circuit I, indicated at 144, and to start input 146 of gating circuit II, indicated at 148, so that when the time base generator generates a new period the gating circuits I and II are enabled. The output 140 of the time base generator is also coupled to the real time clock of the computer 76, via line 141. The output 126 of the crystal oscillator 124 is coupled to an input 150 of the gating circuit II, which has an output 152 coupled to an input 154 (FIG. 4B) of a high speed 24 bit counter 156. The differential line receiver 122 has an output 158 coupled to an input 160 of the gating circuit I, and this gating circuit has an output 162 coupled to an input 164 of a counter 166. Now, when the gating circuits I and II are enabled, the 10 MHz. pulse train from crystal oscillator 124 passes through the gating circuit II to the high speed 24 bit counter 156, and 5 to 10 KHz signal on the differential line receiver output 158 passes through the grating circuit I to the counter 166.

As seen in FIG. 4B, there is provided a conword II circuit 168, which includes logic circuitry and has an input 170 for receiving information from the computer 76 indicating the number of periods, outputted by the differential line receiver 122, to be measured, i.e. 4000, 2000, 1000, or 500. As output 172 of the conword II circuit 168 is coupled to an input 174 of a binary comparator 176. A second input 178 couples the comparator to an output 180 of the counter 166. It will be appreciated that the conword I and II circuits 132, 168 have previously been programmed by the computer according to the ratio of the maximum feed rate to the desired feed rate of the feeder assembly 10. A feeder assembly with a high desired feed rate will have a relatively large change in weight per unit of time and, once the rate is controlled, a large change in the rate of change of the pulse train frequency outputted from the voltage to frequency converter 110. This enables measurements to be made more rapidly according to the following schedule:

| RATIO | MAX. FEED RATE / DESIRED FEED RATE | NUMBER OF PERIODS MEASURE (CONWORD II) | TIME BASE (CONWORD I) | RESULTANT TIME REQUIRED FOR MEASUREMENT |
|---|---|---|---|---|
| | 1 TO 2 | 500 | .125 sec. | 0.05-0.1 sec.* |
| | 2 TO 4 | 1000 | .250 sec. | 0.1-0.2 sec.* |
| | 4 TO 8 | 2000 | .500 sec. | 0.2-0.4 sec.* |

| RATIO | MAX. FEED RATE / DESIRED FEED RATE | NUMBER OF PERIODS MEASURE (CONWORD II) | TIME BASE (CONWORD I) | RESULTANT TIME REQUIRED FOR MEASUREMENT |
|---|---|---|---|---|
| | 8 AND ABOVE | 4000 | 1.000 sec. | 0.4–0.8 sec.* |

*Depends on frequency of pulse train.

Thus, the number of periods designated by Conword II fixes the number of periods that go through gate I, i.e. the number of periods determines the gate cycle. The time base (Conword I) starts the operation of the gates, such as every 0.125 seconds, for example.

The resultant time it takes to get n periods, such as 500 for example, through gate I is, for example, 0.05 seconds when the frequency of the voltage to frequency converter 110 is 10 KHz and 0.1 seconds when the frequency of the voltage to frequency converter is 5 KHz.

The comparator 176 has an output 182, which is coupled to an input 184 of a two phase one shot 186, having a first output 188 and a second output 190. The first output 188 is coupled to an input 192 of a 24 bit data latch or register 194. The second output 190 of the one shot is connected to an input 196 of the high speed 24 bit counter 156 and is also coupled to an input 198 of the counter 166. The output 182 of the binary comparator 176 is also coupled to an input 200 of the gating circuit I and to an input 202 of the gating circuit II.

In operation, the counter 166 outputs the number of pulses counted to the comparator 176 and when the comparator indicates that the number of pulses counted equals the preselected number, as indicated by the conword II circuit 168, it outputs a signal from its output 182 to the two phase one shot 186 which, in turn, signals the 24 bit data latch 194 to receive 24 bits of data from the high speed 24 bit counter 156 which is coupled thereto as by coupling 204. The second output 190 of the two phase one shot applies a signal at 196 to clear and reset the high speed 24 bit counter 156 and a signal at 198 to clear and reset the counter 166. At the same time the output 182 of the binary comparator 176 outputs a signal to the input 200 of the gating circuit I and the input 202 of the gating circuit II, to open and reset these circuits. These circuits now await the start of a new time base generator output. In addition, the output 182 outputs a signal via one shot 183 to the computer 76, indicating that the data is ready.

Meanwhile, the computer 76 has a minimum of 75 milliseconds in which to respond to the data ready signal. Still referring to FIG. 4B, the 24 bit data latch 194 has an output 206 coupled to an input 208 of a multiplexer 210. The multiplexer also has an input 212 coupled to conword III circuit 214, that receives signals from the computer 76 indicating the timing and sequence in which the three 8 bit groups of the 24 bit latch will be selected to be outputted by the multiplexer 210 on the line 216 to the computer for processing in conjunction with the time base information furnished by line 141.

When the time base generator 130 initiates a new period, the foregoing sequence is repeated.

A binary number system is employed as the code for information handling because of certain advantages hereinafter brought out. Thus, the weigh feeder system is provided with a digital computer 76, which includes processing, memory and control systems. Any suitable digital computer may be employed such as a micro processor Model IMP16C/300 and memory Model IMP16P/004P, as manufactured by National Semiconductor Corp., or an LSI-11 as manufactured by Digital Equipment Corp., for example.

As best seen in FIG. 5, a plurality of inputs are applied to the processor to control the same. A conventional off-on switch 218 serves to control the main power supply to the processor. A switch 220 is provided whereby the refill sequence may be automatically actuated (switch in "auto") when product level reaches low level, or at any product level (switch in "manual"), or the refill sequence may be bypassed (when switch is in "bypass"). The refill sequence is a procedure wherein the motor speed will not lockout for refill, thereby actuating the refill controller, until the computer first senses that the scale is undisturbed by foreign influences and secondly, senses that the feed rate agrees with the set feed rate. Input switch 222 serves to convert the system between gravimetric control and volumetric control, as desired. This will be explained more fully hereinafter. A reset total push button switch 224 serves to reset the processor for an entirely new batch of data. Also, there is provided a scale weight switch 226, that inputs into the processor the scale weight, S, which is determined by the size or model of the feeder assembly 10 being employed in the particular installation. This factor is set once and is not adjusted unless a new model or size of feeder assembly is installed.

A motor speed input switch 228 is provided, which is set by the operators at a preselected percent in the range between 0% to 100%, to input into the processor the desired operating speed of the motor when operating volumetrically.

Input switch 230 is actuated by the operator to input the desired feed rate R (LBS./HR) into the processor. This is a digital word, stored in memory, that represents the desired slope of the feed line, which for the embodiment illustrated in FIG. 1 is indicated by curve 232, FIG. 7, for example. Input switch 234 is also actuated by the operator to input the under weight set point into the processor memory. It represents the selected minimum limit of the feed rate range, as is indicated by the dotted line 236 in FIG. 7. This limit is expressed as a percentage of from 0 to 9.99% below the desired feed rate R. Input switch 238 inputs the overweight set point into memory. It represents the selected maximum limit of the feed range, as is indicated by the dotted line 240 in FIG. 7. This limit also is expressed as a percentage of from 0 to 9.99% above the desired feed rate R.

Still referring to FIG. 5, digital switch 242 is an operator activated switch to input into the memory, the desired minimum or low level of the material in the container 12, FIG. 1, or container 28, FIG. 2, or container 46, FIG. 3. The range of this switch is from 0 to 99.9%. Thus, for example, if the operator desires the system to shift into its refill mode when the container 12 or 28 or 46 is down to 5% of its capacity, he sets the low level switch 242 at 05.0%. Digital input switch 244 is an out of low level switch with a range of from 0 to 99.9% so that the operator can input into memory the desired level for the system to shift out of its refill mode to its normal operative mode. Thus, for example, the operator could set this switch for 90.0%, whereby when the container 12 or 28 or 46 reaches 90% of its capacity, the system would shift out of its refill mode to its normal operative mode.

In addition, the processor also receives a signal from a shaft encoder 246, FIGS. 1–3. This allows a correlation to be made between the shaft angle and system noise induced by the movement of the material and machinery mounted on the scale or, in the case of FIG. 1, the movement of the product in the storage hopper. This correlation may then be used as a correction factor, subtracting out noise components due to moving machinery on the scale such as for example, the motor, gear box, augers, as well as movement of the material in the container. The processor 76 is provided with a learn mode input switch 248, which is shiftable between normal operation and learn mode operation. When a new material is going to be processed by the system or when the system is first installed, the system is set in operation, but instead of discharging the substance 14, FIG. 1, out of the system, it is collected in a small container, not shown, and retained on the scale 22 so that there is no net loss of weight from the scale. The switch 248 is shifted to its learn mode position. The motor 18 is run throughout its speed range and the shaft encoder 246 senses the shaft angle, while the input circuit to the computer 76, including the LVDT, picks up the noise corresponding to the rotational position of the drive shaft and sends out digital signals to the processor, which are stored in memory. After this information has been stored in memory, the small container is removed from the scale and the switch 248 is shifted to its normal operation. This same technique is applicable to the feeder assemblies of FIGS. 2 and 3, using a container on the respective scales to receive the material being discharged.

FIG. 8 illustrates the positional relationship of the shaft encoder 246 with respect to the system noise detected for a particular shaft speed during the learn mode operation. FIG. 9 illustrates the output of the voltage to frequency converter 110 with respect to time, before it is corrected for the induced system noise. Processor 76, as another operation thereof, subtracts the stored system noise data from the data received from the voltage to frequency converter, through the multiplexer 210, to present connected values of this information for processing. FIG. 10 illustrates the corrected output from the voltage to frequency converter 110 with respect to time. Any suitable type of shaft encoder may be employed such as a Series 2500, Optical Encoder, as manufactured by Renco Corporation.

The microprocessor 76 has, as an output, a display device 250 which indicates the total feed commanded. This device indicates the total feed asked for by the operator over a relatively long period of time. Thus, the processor, as one operation thereof, receives the selected feed rate R from the input switch 230 and integrates it with respect to the elapsed time and continuously displays the total feed commanded, in pounds. As another output there is provided a display device 252 which indicates the actual total feed discharged from the feeder assembly 10. Thus, the processor, as one operation thereof, receives a signal from the multiplexer 210 corresponding to the total scale weight, which, in the FIG. 1 apparatus, indicates the quantity of material remaining in the container. This signal represents the weight of the material in the bin 12. Any change in this signal, except during refill, represents the amount of material fed. These changes are totalled by the processor to give the actual total feed, in pounds. During refill, in the FIG. 1 apparatus, the amount of material fed is computed by the processor from the reading of the feed rate meter and the time it takes to refill. When refill is completed the signal from the multiplexer 210 is again used to compute the total amount of material fed. In the FIG. 2 and FIG. 3 apparatus the total feed discharged can be determined directly from the measured weight of the material being delivered. The operators can compare the actual total feed, as displayed at 252, with the total feed commanded, as displayed at 250, to determine how the system is functioning and, if necessary, take corrective action.

A feed rate display device, such as a four digit meter, 254, for example, shows the actual feed rate in pounds per hour of the feeder assembly. Thus, the processor, as another operation thereof, receives the scale weight signal from the multiplexer 210 and corrects this signal, as pointed out hereinbefore, and then differentiates the signal with respect to time to produce a signal indicative of the present rate of feed. This can be visually compared to the desired feed rate as set by the input switch 230 to determine possible malfunctions in the system.

A scale weight display device, such as a three digit meter 256, for example, is provided to indicate the actual percentage of product remaining in the container 12 on the scale 22 of FIG. 1. Thus, the processor, as still another operation thereof, receives a signal from the multiplexer 210 corresponding to the weight on the scale 22 and computes the actual percentage of material remaining in the container 12. Next, there is provided, as another output of the processor 76, a three digit motor speed meter 258 which indicates the actual speed of the motor 18. That is, the processor receives a signal from a tachometer 260, indicating the speed of the motor 18, by a conductor 262 through a conventional analog-digital converter 264, and outputs a motor speed on meter 258. While this speed is usually relatively constant, it may vary to some extent over a long period of time. It is advantageous for the operator to know, as any sudden variations may indicate a blockage of material in the system.

In addition, there are provided operational and warning indicators, such as lights, buzzers, or the like, for example, for purposes of keeping the operators informed. An underweight light 266 indicates when the actual feed rate, as indicated by the meter 254, falls below the underweight set point 234, and overweight light 268 indicates when the actual feed rate exceeds the overweight set point 238. That is, when the actual feed rate falls below the line 236, FIG. 7, which is set by the underweight set point switch 234, the underweight light 266 is actuated, and when the actual feed rate is above the line 240, FIG. 7, which is set by the overweight set point switch 238, the overweight light 268 is actuated. Preferably, there is a preselected time delay period of from about 0 to about 3 minutes delay after the feed rate meter 254 indicates an overweight or an underweight condition before the warning lights are actuated. Light 270 shows when the system is in its refill mode, i.e. when the container 12 is being refilled. The light 272 indicates that the system is in its ACRILOK mode. This mode of operation will be explained more fully hereinafter. Run light 274 indicates that the system is in operation and standby light 276 indicates that the system power has been applied, but all machinery is stopped. The light 278 indicates that the bin 12 is in its low level condition.

A control output 280 from the processor 76 is applied to a digital-analog converter (DAC) 282. Any suitable type of DAC may be employed, such as a 10 bit Model AD7520L, as manufactured by Analog Devices, Inc., for example. In the DAC, the digital word is converted to an analog signal, which is applied to the tachometer 260 and an SCR motor control 284. Any suitable type of motor control may be employed such as Acrison, Inc.'s Model ACR100BTG, for example. This controller produces an output which is applied to the motor 18 to control the speed thereof, and thereby control the discharge rate of the material from the feeder assembly 10.

In operation, the operator must determine whether he wishes to operate in the volumetric mode or the gravimetric mode. If the volumetric mode is selected, then the operator sets the motor speed switch 228 to the desired motor speed. In this mode of operation, the output of the processor is a digital word conveyed by conductor 280 to the DAC 282. The DAC causes a voltage from 0 to 6 volts to appear on conductor 286 and the SCR motor control adjusts the speed of the DC motor 18 until the output of the tachometer 260 exactly equals the voltage on the conductor 286. While this mode of operation is desirable at certain times, it does not provide as high a degree of accuracy as the gravimetric mode and, consequently, the gravimetric mode is predominantly employed.

In operation, when employing the embodiment of FIG. 1, when the operator sets the switch 222 to the gravimetric mode of operation, the operator then sets the feed rate switch 230 to the desired feed rate R (LBS./HR.), which, as discussed hereinbefore, determines the slope of the feed curve or line 232, FIG. 7. Samples are taken and stored in the computer memory. The samples, generally illustrated in FIG. 7 by dots, form the actual feed curve 288. It is noted that for each point or sample the gating circuits I and II open and close. The computer has programmed therein a calculation time cycle, during which cycle the computer receives and stores a number of samples. The calculation time cycle, as well as the number of samples taken during such a cycle is a function of the feed rate of the machine. For example, if the machine has a high feed rate four samples may be taken for each calculation time cycle and if the machine has a low feed rate sixty samples may be taken for each calculation time cycle. The calculation time cycle may range from about ½ second to about 60 seconds, for example, depending on the feed rate. Once during each calculation time cycle the processor computes a regression on these samples with respect to time, and thence computes the RMS error of the slope.

FIG. 7 illustrates an upper 3 RMS error line at 290 and a lower 3 RMS error line at 292. If less than two, for example, sample data points exceed 3 RMS error in either direction, as indicated at 294 in FIG. 7, regression on time is recomputed with the data points exceeding 3 RMS, as indicated at 296, excluded. Thence, the computed slope of the actual feed curve is compared with the slope of the desired or set point feed line, and a corresponding correction command is outputted at 280 to adjust the motor control 284, thereby to adjust the actual rate of discharge of the material from the feeder assembly 10. This calculation time cycle is continuously repeated to continuously adjust the motor control 284.

If more than two, for example, sample data points exceed 3 RMS error in either direction, as indicated at 298 in FIG. 7, the system is changed into its ACRILOK mode. That is, the ACRILOK light 272 is energized and the output command 280 to the DAC 282 and motor control 284 is not updated, but continues in its present state. That is, the processor continues to receive sample signals from the multiplexer 210 and computes the regression analysis thereof, but no correction command is outputted at 280. The feed rate meter 254 is also locked at the last control data point. The feed system remains in a locked condition until a subsequent calculation time cycle of operation less than two data points exceed 3 RMS error, and then the system is returned to its normal operating mode and the correction command is again outputted at 280.

In the alternative, as illustrated in FIG. 11, the computer may be programmed in a second manner for outputting correction commands at 280 to adjust the motor control 284. In operation, the operator sets the feed rate switch 230, FIG. 5, to the desired feed rate R (LBS./HR.) which, as discussed hereinbefore, determines the slope of the desired feed curve or line 306, FIG. 11. As pointed out in connection with the computer program illustrated in FIG. 7, samples are taken and stored in the computer memory. The samples, generally illustrated in FIG. 11 by dots 307, form the actual feed curve in segments, as indicated at 308, 310, 312, 314 and 316. It is noted that for each point or sample the gating circuits I and II open and close. As pointed out hereinbefore, the computer has programmed therein a calculation time cycle, during which cycle the computer receives and stores a number of samples. The calculation time cycle, as well as the number of samples taken during such a cycle, is a function of the feed rate of the machine. For example, if the machine has a high feed rate four samples may be taken for each calculation time cycle and if the machine has a low feed rate sixty samples may be taken for each time cycle. In FIG. 11 eight samples are shown for each calculation time cycle, for example. The calculation time cycle may range from about ½ second to about 60 seconds, for example, depending on the feed rate. Once during each calculation time cycle the processor computes a regression on these samples with respect to time to determine the slope of the actual feed line during such calculation time cycle. The slope of one calculated time period or segment is compared to the last derived slope to determine the deviation thereof. Thus, the percentage variation of the slope of segment 310 is compared to that of segment 308. If the variation is within an acceptable range, then the slope is adjustable, and a corresponding correction command is outputted at 280 of the computer to adjust the motor control 284, thereby to adjust the actual rate of discharge of the material from the feeder assembly 10. The aforesaid acceptable range is predetermined and it may be constant or it may be variable. As an example, it may be within about 5 to 10% of the absolute value. However, if the percentage variation of the slope segment, such as that indicated for segment 312, is beyond the acceptable range, the system is changed into its ACRILOK mode. That is, the ACRILOK light 272 is energized and the output command 280 to the DAC 282 and motor control 284 is not updated, but continues in its present state. Thus, the processor continues to receive sample signals from the multiplexer 210 and compute the regression analysis thereof, but no correction command is outputted at 280. The feed rate meter 254 is also locked at the last control data point. The feed system remains in a locked condition until in a subsequent calculation time cycle of operation the variation of the slope is within an acceptable range, and then the system is returned to its normal operating mode and the correction command is again outputted at 280.

As indicated above, the embodiment of FIG. 1 is a weight loss system wherein the weight on the scale as sensed by the LVDT gradually diminishes until the container 12 is empty. On the other hand, in the embodiments of FIGS. 2 and 3, the weight on the scale as sensed by the LVDT remains substantially constant. Thus, the output of the voltage to frequency converter 110 is also substantially constant at some frequency, such as 6 KHz., for example. That is, if the frequency outputted from the voltage to frequency converter 110 is constant at 5 KHz. then the rate of flow is zero, and if the frequency is 10 KHz, there would be maximum or full flow of the machine. The computer receives signals from the multiplexer 210 corresponding to the output of the voltage to frequency converter 110 in the same manner as that described hereinbefore. FIG. 12 illustrates the manner in which the computer is programmed for this mode of operation. In this mode of operation, the desired feed curve 318 is a straight horizontal line. Samples as indicated by dots 320 are taken and stored in the computer memory in the same manner as that described hereinbefore in connection with the mode of operation of FIG. 11. Thus, the samples form the actual feed curve in segments, as indicated at 322, 324, 326, 328 and 330. As indicated before, once during each calculation time cycle the processor computes a regression on these samples with respect to time to determine the slope of the actual feed line during such calculation time period cycle. The slope of one calculation time period or segment is compared to the last derived slope to determine the deviation thereof. Thus, the slope of segment 324 is compared to that of segment 322, and if the variation is within an acceptable range, then the slope is adjustable, and a corresponding correction command is outputted at 280 of the computer to adjust the motor control 284, thereby to adjust the actual rate of discharge of the material from the feeder assembly 10. The aforesaid acceptable range is predetermined as described above in connection with FIG. 11. If the percentage variation of the slope segment such as that indicated for segment 328, is beyond the acceptable range, the system is changed into its ACRILOK mode. As before, the system remains in the ACRILOK mode until in a subsequent calculation time cycle of operation the variation of the slope is within an acceptable range of the last slope that was acceptable, and then the system is returned to its normal operating mode and the correction command is again outputted at 280.

As still another operation of the processor, the total feed commanded, as indicated at 250, is compared to the actual total feed, as indicated at 252, periodically, such as every 5 or 10 minutes, for example. If there is a deviation exceeding predetermined limits, the processor modifies the aforementioned command output at 280 to gradually correct the actual feed to the total feed. This is programmed to take from about 5 minues to about 10 minutes, thereby to avoid sharp fluctuations in the feed rate command, but nevertheless, obtain as close as possible the total feed selected over a long period of time. This is, in effect, an override command and modifies the correction command, described hereinbefore, as outputted at 280 of the computer. It is applicable to all of the gravimetric modes of operation described above, including the embodiments of FIGS. 1, 2 and 3.

A further operation of the processor, in the embodiment of FIG. 1, is to determine when the scale weight, as indicated by the meter 256, drops to a predetermined low level, as set by the low level switch 242, and then search for an "on rate" condition. In the embodiments of FIGS. 2 and 3 a sensor 299 is provided for sensing the level of the material in the containers 28 and 46, respectively, and when the level thereof drops to a predetermined low level, as set by the low level switch 242, the processor searches for an "on rate" condition. That is, the output signal outputted at 254 is monitored until the difference between it and the feed rate switch 230 is less than a predetermined error limit. Thence, the system is changed into its refill mode wherein the output command 280 and feed rate meter 254 are not updated, but are retained in their present state, similar to their operation as described hereinbefore in connection with the ACRILOK mode. At the same time, a command is outputted to a refill cicuit 300, which sends a signal to a refill controller 302 that controls the flow of material from a refill source 304 to the container 12, FIG. 1, container 28, FIG. 2, and container 46, FIG. 3. The controller 302 could be an AC motor when handling dry particulate material or could be a value when handling liquids.

The system remains in the refill mode until, in the embodiment of FIG. 1, the processor detects that the container 12 is refilled, as indicated by the scale weight meter 256, and as selected by the out of low level switch 244. In the embodiments of FIGS. 2 and 3, the sensor 299 detects when the containers 28 and 46 are refilled to the extent, as selected by the out of low level switch 244. At this time, the processor outputs a signal to the refill circuit 300 which, in turn, directs the refill controller 302 to discontinue refilling the container 12, FIG. 1, container 28, FIG. 2, and container 46, FIG. 3. The processor then returns the system to its normal operational mode.

FIGS. 13 to 19 are flow charts of the computer 76. Thus, FIG. 13 is a flow chart showing the program start, and FIG. 14 is a flow chart of the background routine. FIG. 15 is a flow chart of the timer routine and FIG. 16 shows the keyboard interrupts. FIG. 17 is a flow chart of the calculation routine, and FIG. 18 computes the scale weight and hopper levels, while FIG. 19 gives the subroutine description. Appendix A is a program with descriptive comments for carrying out the basic operations of the computer 76.

From the foregoing disclosure, it can be seen that the instant invention provides an improved weigh feeding apparatus, wherein the discharge rate of a substance from a container may be maintained at a preselected constant value, wherein the container may be automatically refilled during the continuous discharge of the substance, wherein excessive excursions of the system are eliminated, wherein extraneous data recordings are eliminated when calculating the flow rate, and wherein past flow rate values may be stored in memory and compensated for at a later point in time.

Although certain particular embodiments of the invention have been herein disclosed for purposes of explanation, various modifications thereof, after study of the specification, will be apparent to those skilled in the art to which the invention pertains.

What is claimed is:

1. A weigh feeding machine comprising a container for a substance;

discharge means for discharging the substance from the container at a controllable feed-out rate;

means for producing a first electrical signal corresponding to the desired feed-out rate;

means for sensing the weight of at least the substance in the container and for producing a second electrical signal having a characteristic which is proportional to the value of said weight;

means for sampling said second electrical signal during each of a succession of time intervals;

means for computing a feed-out rate from signals derived from said sampling and for comparing an electrical signal representative of said computed feed-out rate with the first electrical signal, and for producing, as a result of said comparison, a control electrical signal indicative of the desired changes, if any, in the feed-out rate of the discharge means;

control means for controlling the discharging means in accordance with said control electrical signal to thereby maintain the feed-out of the substance from the container at the desired feed-out rate; and means for comparing a signal derived from at least one sample taken during one of said time intervals with a signal derived from at least one sample taken during another of said time intervals, for repeating said comparison for successive time intervals, so that the signal derived during each of said successive time intervals is compared with a signal derived during a different time interval, and for inhibiting the action of the control electrical signal on the control means when said comparison shows a difference between the compared signals beyond a predetermined limit.

2. A weigh feeding machine according to claim 1, wherein the comparison and inhibiting means compares a signal derived during each time interval with a signal derived during the immediately preceding time interval.

3. A weigh feeding machine according to claim 2, wherein, when the last-mentioned comparison produces a difference beyond said predetermined limit, said inhibiting means inhibits the control electrical signal so as to permit the feed-out rate to continue at a rate established by at least one preceding control electrical signal.

4. A weigh feeding machine comprising a container for a substance;

discharge means for discharging the substance from the container at a controllable feed-out rate;

storage means for storing a first electrical signal corresponding to the desired feed-out rate;

means for sensing the weight of at least the substance in the container and for producing a second electrical signal at a frequency which corresponds to the value of said weight and changes for the different values of weight sensed;

means for sampling the second electrical signal during each of a succession of time intervals;

digital circuit means for comparing an electrical signal derived from said sampling of said second electrical signal with an electrical signal derived from said first electrical signal, for producing, as a result of said comparisons, control electrical signals indicative of the desired changes, if any, in the feed-out rate of the discharge means;

control means for controlling the discharging means in accordance with said control electrical signal to thereby maintain the feed-out of the substance from the container at the desired feed-out rate;

means for comparing a signal derived from at least one sample taken during one of said time intervals with a signal derived from at least one sample taken during another of said time intervals, for repeating said comparison for successive time intervals, so that the signal derived during each of said successive time intervals is compared with a signal derived during a different time interval, and for inhibiting the action of the control electrical signals on the control means when said comparison shows a difference between the compared signals beyond a predetermined limit.

5. A weigh feeding machine comprising a container for a substance;

discharge means for discharging the substance from the container at a controllable feed-out rate;

means for producing a first electrical signal corresponding to the desired feed-out rate;

means for sensing the weight of at least the substance in the container and for producing a second electrical signal proportional to the value of said weight;

digital circuit means for comparing an electrical signal derived from said sampling of said second electrical signal with an electrical signal derived from the first electrical signal, for producing, as a result of said comparison, a control electrical signal indicative of the desired changes, if any, in the feed-out rate of the discharge means;

control means for controlling the discharging means in accordance with said control electrical signal to thereby maintain the feed-out of the substance from the container at the desired feed-out rate;

means for comparing a signal derived from said second electrical signal during each of a succession of time intervals with a signal derived from said second electrical signal during a different one of said time intervals; and means, responsive to said comparisons of signals derived from said second electrical signal during successive time intervals, for inhibiting the control means when said comparison shows a difference between the compared signals beyond a predetermined limit and for establishing a feed-out rate corresponding to the value of at least one preceding control electrical signal.

6. A weigh feeding machine according to claim 5 wherein said sampling and comparing means compares a signal derived from at least one sample taken during each time interval with a signal derived from at least one sample taken during the immediately preceding time interval.

7. A weigh feeding machine comprising a container for a substance;

discharge means for discharging the substance from the container at a controllable feed-out rate;

storage means for storing a first electrical signal corresponding to the desired feed-out rate;

means for sensing the weight of the container and its contents and for producing a second electrical signal at a frequency which corresponds to the value of said weight;

digital circuit means for sampling the second electrical signal during each of a succession of time intervals;

storage means for storing the frequency signals representative of the samples of said second electrical signal during such succession of time intervals;

digital computer means for computing a succession of feed-out rates from the frequency signals corresponding to the samples taken during said successive time intervals, and for comparing an electrical signal representative of each said computed feed-out rate with the first electrical signal representative of said desired feed-out rate, for producing, as a result of said comparisons, control electrical signals indicative of the desired changes, if any, in the feed-out rate of the discharge means;

control means for controlling the discharging means in accordance with said control electrical signals to thereby maintain the feed-out of the substance from the container at the desired feed-out rate; and means for comparing a signal derived from at least one sample taken during one of said time intervals with a signal derived from at least one sample taken during another of said time invervals, for repeating said comparison for successive time intervals, so that the signal derived during each of said successive time intervals is compared with a signal derived during a different time interval, and for inhibiting the action of the control electrical signal on the control means when said comparison shows a difference between the compared signals beyond a predetermined limit.

8. A weigh feeding machine comprising a container for a substance;

discharge means for discharging the substance from the container at a controllable feed-out rate;

storage means for storing a first electrical signal corresponding to the desired feed-out rate;

means for sensing the weight of the substance discharged from the container and for producing a second electrical signal at a frequency which corresponds to the instantaneous value of said weight;

digital circuit means for sampling the second electrical signal during each of a succession of time intervals;

storage means for storing the frequency signals representative of the samples of said second electrical signal;

digital circuit means for comparing electrical signals derived from said sampling of said second electrical signal with an electrical signal derived from the first electrical signal, for producing, as a result of said comparison, a control electrical signal indicative of the desired changes, if any, in the feed-out rate of the discharge means;

control means for controlling the discharging means in accordance with said control electrical signal to thereby maintain the feed-out of the substance from the container at the desired feed-out rate;

means for comparing a signal derived from samples taken during each of a succession of said time intervals with a signal derived from said second electrical signal during a different one of said time intervals; and means, responsive to the last-mentioned comparisons, for inhibiting the control means when said comparison shows a difference between the compared signals beyond a predetermined limit and for establishing a feed-out rate corresponding to the value of a least one preceding control electrical signal.

9. A weigh feeding machine comprising a container for a substance;

discharge means for discharging the substance from the container at a controllable feed-out rate;

storage means for storing a first electrical signal corresponding to the desired feed-out rate;

means for sensing the weight of at least the substance in the container and for producing a second electrical signal at a frequency which corresponds to the value of said weight and changes for the different values of weight sensed;

digital circuit means for sampling the second electrical signal successively, each sampling including a predetermined number of periods of said second electrical signal;

said digital circuit means sampling said second electrical signal a plurality of times during each of a succession of time intervals;

storage means for storing the samples of said second electrical signal during each such time interval;

digital computer means for computing a feed-out rate during each such time interval, from the samples taken during such time interval, and for comparing an electrical signal representative of said computed feed-out rate with the first electrical signal representative of said desired feed-out rate, for producing, as a result of said comparison, a control electrical signal indicative of the desired changes, if any, in the feed-out rate of the discharge means;

control means for controlling the discharging means in accordance with said control electrical signal to thereby maintain the feed-out of the substance from the container at the desired feed-out rate; and means for comparing a signal derived from at least one sample taken during one of said time intervals with a signal derived from at least one sample taken during another of said time intervals, for repeating said comparison for successive time intervals, so that the signal derived during each of said successive time intervals is compared with a signal derived during a different time interval, and for inhibiting the action of the control electrical signal on the control means when said comparison shows a difference between the compared signals beyond a predetermined limit.

10. A weigh feeding machine according to claim 9, wherein, during each sampling, said digital circuit means samples said second electrical signal for a number of periods of said second signal which varies inversely with the value of the desired feed-out rate.

11. A weigh feeding machine according to claim 9, wherein, during each time interval, said digital circuit means samples said second electrical signal a number of times which varies inversely with the desired feed-out rate.

12. A weigh feeding machine according to claim 9, wherein said means for comparing compares the signal representative of the computed feed-out rate for each time interval with the signal representative of the computed feed-out rate for at least one preceding time interval.

13. A weigh feeding machine according to claim 9, wherein the comparison means for the computed feed-out rate compares the signal representative of each computed feed-out rate with the signal representative of the computed feed-out rate for the immediately preceding time interval.

14. A weigh feeding machine according to claim 9, wherein, when the comparison between the signals for the computed feed-out rates for different time intervals is beyond said predetermined limit, said inhibiting means inhibits any control electrical signal from being transmitted to the control means, so that the feed-out rate continues at the rate to which it was last corrected.

15. A weigh feeding machine according to claim 9, wherein, the digital circuit means includes a high frequency oscillator having an operating frequency at least an order of magnitude higher than the frequency corresponding to the value of the weight being sensed;

gating means coupled to said high frequency oscillator; and second control means for enabling said gating means for a period of time corresponding to a predetermined number of periods of the frequency corresponding to the weight being sensed, to pass signals from said high frequency oscillator during said period of time, to thereby convert the frequency of the weight being sensed to said high frequency.

16. A weigh feeding machine according to claim 15, wherein said second control means enables the gating means for a predetermined number of periods which varies inversely with the value of the desired feed-out rate.

17. A weigh feeding machine according to claim 15, further including storage means for storing the signals from said high frequency oscillator; and multiplexing means coupled to said storage means for multiplexing the different portions of the high frequency signal out of said storage means in a predetermined sequence.

18. A weigh feeding machine according to claim 15, wherein said gating means includes a first gating means for the low frequency second electrical signal and a second gating means for the high electrical signal from said oscillator; and said second control means enables said first and second gating means simultaneously;

further including a first counter coupled to said first gating means for counting the periods of said low frequency second electrical signal, a second counter coupled to said second gating means for counting the periods of said high frequency electrical signal, and disabling means responsive to said first counter reaching a predetermined count for disabling said second gating means.

19. A weigh feeding machine according to claim 18, wherein said disabling means includes a comparison circuit coupled to said first counter for producing a disabling signal when said first counter has reached a predetermined count, for disabling said first and second gating means.

20. A weigh feeding machine comprising a container for a substance;

discharge means for discharging the substance from the container at a controllable feed-out rate;

storage means for storing a first electrical signal corresponding to the desired feed-out rate;

means for sensing the weight of at least the substance in the container and for producing a second electrical signal at a frequency which corresponds to the value of said weight and changes for the different values of weight sensed;

digital circuit means for sampling the second electrical signal a plurality of times during a predetermined time interval, for a succession of said time intervals;

said digital circuit means including circuit means for converting the frequency of the sampled signal to a higher frequency which is a least an order of magnitude higher than the frequency of the sampled signal;

storage means for storing the higher frequency signals representative of the samples of said second electrical signal during each such time interval;

digital computer means for computing a feed-out rate during each such time interval, from the higher frequency signals corresponding to the samples taken during one such time interval, and for comparing an electrical signal representative of said computed feed-out rate with the first electrical signal representative of said desired feed-out rate, for producing, as a result of said comparison, a control electrical signal indicative of the desired changes, if any, in the feed-out rate of the discharge means;

control means for controlling the discharging means in accordance with said control electrical signal to thereby maintain the feed-out of the substance from the container at the desired feed-out rate; and means for comparing the signal representative of the computed feed-out rate for each such time interval with the signal representative of the computed feed-out rate for at least one preceding time interval; and inhibiting means, responsive to said comparison of computed feed-out rates, for inhibiting the action of the control electrical signal on the control means when said comparison shows a difference between the computed feed-out rates beyond a predetermined limit.

21. A weigh feeding machine according to claim 20 wherein said digital circuit means samples said second electrical signal for a predetermined number of its periods during each sampling, and produces a larger number of periods at the higher frequency extending over substantially the same time duration.

22. A weigh feeding machine according to claim 20, wherein said digital circuit means includes a high frequency oscillator having an operating frequency at least an order of magnitude higher than the frequency corresponding to the value of the weight being sensed;

gating means coupled to said high frequency oscillator; and second control means for enabling said gating means for a period of time corresponding to a predetermined number of periods of the frequency corresponding to the weight being sensed, to pass signals from said high frequency oscillator during said period of time, to thereby convert the frequency of the weight being sensed to said high frequency.

23. A weigh feeding machine comprising a container for a substance;

discharge means for discharging the substance from the container at a controllable feed-out rate;

storage means for storing a first electrical signal corresponding to the desired feed-out rate;

means for sensing the weight of at least the substance in the container and for producing a second electrical signal having a characteristic which corresponds to the value of said weight;

said digital circuit means sampling said second electrical signal a plurality of times during each of a succession of time intervals;

storage means for storing the samples of said second electrical signal during each such time interval;

digital computer means for computing a feed-out rate during each such time interval, from the samples taken during one such time interval, and for comparing an electrical signal representative of said computed feed-out rate with the first electrical signal representative of said desired feed-out rate, for producing, as a result of said comparison, a control electrical signal indicative of the desired changes, if any, in the feed-out rate of the discharge means;

control means for controling the discharging means in accordance with said control electrical signal to thereby maintain the feed-out of the substance from the container at the desired feed-out rate; and means for comparing a signal derived from at least one sample taken during one of said time intervals with a signal derived from at least one sample taken during another of said time intervals, for repeating said comparison for successive time intervals, so that the signal derived during each of said successive time intervals is compared with a signal derived during a different time interval, and for inhibiting the action of the control electrical signal on the control means when said comparison shows a difference between the compared signals beyond a predetermined limit.

24. A weigh feeding machine according to claim 23, wherein the means for comparing the signals derived from samples taken in different time invervals compares the signal representative of each computed feed-out rate with the signal representative of the computed feed-out rate for the immediately preceding time interval.

25. A weigh feeding machine according to claim 23, wherein, when comparison between the signals derived from samples taken in different time intervals is beyond said predetermined limit, said inhibiting means inhibits any control electrical signal from being transmitted to the control means, so that the feed-out rate continues at the rate to which it was last corrected.

26. A weigh feeding device comprising a container for a substance;

discharge means for discharging the substance from the container at a controllable feed-out rate;

storage means for storing a first electrical signal corresponding to the desired feed-out rate;

means for sensing the weight of at least the substance in the container;

first circuit means responsive to said sensing means for producing a succession of second electrical signals, each at a frequency which is responsive to the value of the weight sensed;

counting means for counting the cycles of each of said second electrical signals to produce a succession of total counts, each of which is a measure of the value of the weight sensed;

a digital circuit for storing said total counts and comparing an electrical signal responsive to a plurality of said total counts with the first electrical signal representative of said desired feed-out rate, for producing, as a result of said comparison, a control electrical signal indicative of the desired changes, if any, in the feed-out rate of the discharge means; and control means for controlling the discharge means in accordance with said control electrical signal to thereby maintain the feed-out of the substance from the container at the desired feed-out rate.

27. A weigh feeding device according to claim 26, wherein said digital circuit includes means for computing one or more error limits in the form of deviations from the computed feed-out rate; and means operative in computing the feed-out rate, for excluding from the computation thereof any total count values which fall beyond said error limits.

28. A weigh feeding device comprising a container for a substance;

discharge means for discharging the substance from the container at a controllable feed-out rate;

storage means for storing a first electrical signal corresponding to the desired feed-out rate;

a voltage source for producing an output voltage at a predetermined number of cycles per second;

means for sensing the weight of at least the substance in the container and producing a second electrical signal responsive to said weight;

circuit means responsive to said second electrical signal for gating a succession of cycles of said output voltage from said voltage source for a period of time, the duration of which is dependent upon the value of said weight;

counting means for counting the cycles gated from said source to produce a total count which is a measure of the value of the weight being sensed;

a digital circuit for comparing an electrical signal responsive to said total count with the first electrical signal representative of said desired feed-out rate, for producing, as a result of said comparison, a control electrical signal indicative of the desired changes, if any, in the feed-out rate of the discharge means; and control means for controlling the discharge means in accordance with said control electrical signal to thereby maintain the feed-out of the substance from the container at the desired feed-out rate.

29. A weigh feeding device according to claim 28, wherein said circuit means includes sampling means for repeatedly sampling the second electrical signal from said sensing means;

each such sample controlling the period of time over which the output from said voltage source is gated;

said counting means counting the cycles gated from said source for each said sampling and producing a series of total counts, one for each of said samplings;

storage means for storing all of said total counts; and said digital circuit computing the feed-out rate from a plurality of the total counts which occur during a predetermined time interval.

30. A weigh feeding device comprising a container for a substance;

discharge means for discharging the substance from the container at a controllable feed-out rate;

storage means for storing a first electrical signal corresponding to the desired feed-out rate;

means for sensing the weight of at least the substance in the container and for producing a second electrical signal which corresponds to the value of said weight;

a voltage source for producing an output signal at a predetermined frequency;

counting means for counting the signals from said voltage source;

a digital circuit for sampling the second electrical signal successively and, for each such sampling, gating output signals from said voltage source to said counting means for a period of time which corresponds to a characteristic of said second electrical signal;

storage means for storing a plurality of values corresponding to the total counts of said counting means for all of said samplings;

digital computer means for computing a feed-out rate from the total counts for a plurality of said samples, and for comparing an electrical signal representative of said computed feed-out rate with the first electrical signal representative of said desired feed-out rate, for producing, as a result of said comparison, a control electrical signal indicative of the desired changes, if any, in the feed-out rate of the discharge means; and control means for controlling the discharge means in accordance with said control electrical signal to thereby maintain the feed-out of the substance from the container at the desired feed-out rate.

31. A weigh feeding device according to claim 30, further including circuit means controlled by said digital computer for initiating each successive period of time for which output signals from said voltage source are gated to said counting means, and said digital circuit terminating each such successive period of time at a time which corresponds to the value of the characteristic of the second electrical signal.

32. A weigh feeding device comprising a container for a substance;

discharge means for discharging the substance from the container at a controllable feed-out rate;

means for establishing a first electrical signal corresponding to the desired feed-out rate;

source means for producing an output signal at a predetermined frequency;

counting means coupled to said source means for receiving and counting the signals therefrom;

means for sensing the weight of at least the substance in the container and for producing a second electrical signal having a frequency which corresponds to the value of said weight;

digital circuit means for repeatedly sampling said second signal and controlling the count of said counting means, during each such sampling, to count to the frequency of said second signal at the time of said sampling;

storage means for storing a plurality of values, each corresponding to the count of said counting means for one of said samplings;

digital computer means for computing a feed-out rate for each of a succession of time intervals, from the count samples during one such time interval, and for comparing an electrical signal representative of said computed feed-out rate with the first electrical signal representative of said desired feed-out rate, for producing, as a result of said comparison, a control electrical signal indicative of the desired changes, if any, in the feed-out rate of the discharge means; and control means for controlling the discharging means in accordance with said control electrical signal to thereby maintain the feed-out of the substance from the container at the desired feed-out rate.

33. A weigh feeding device comprising a container for a substance;

discharge means for discharging the substance from the container at a controllable feed-out rate;

means for establishing a first electrical signal corresponding to the desired feed-out rate;

means for sensing the weight of at least the substance in the container and for producing a second electrical signal having a characteristic which corresponds to the value of said weight;

a source of signals at a predetermined frequency;

a counter for counting the signals from said source;

storage means for storing a succession of values corresponding to counts of said counter;

digital circuit means for sampling the second electrical signal successively and for transmitting from said counter to said storage means, for each such sampling, a value corresponding to the count of the counter for a period of time proportional to the weight sensed;

digital computer means for computing a feed-out rate from a plurality of said count values, and for comparing an electrical signal representative of said computed feed-out rate with the first electrical signal representative of said desired feed-out rate, for producing, as a result of said comparison, a control electrical signal indicative of the desired changes, if any, in the feed-out rate of the discharge means; and control means for controlling the discharge means in accordance with said control electrical signal to thereby maintain the feed-out of the substance from the container at the desired feed-out rate.

34. A weigh feeding device according to claim 33 wherein the sensing means produces an electrical signal whose frequency corresponds to the value of the weight being sensed;

further including second counting means for counting the signals from said sensing means; and means responsive to the count in said second counting means for controlling said period of time for said first counting means.

35. A weigh feeding machine comprising a container for a substance;

discharge means for discharging the substance from the container at a controllable feed-out rate;

means for producing a first electrical signal corresponding to the desired feed-out rate;

means for sensing the weight of at least the substance in the container and for producing a second electrical signal having a characteristic which is proportional to the value of said weight;

digital circuit means for sampling said second electrical signal at least once during each of a succession of time intervals;

means for computing a feed-out rate during each of said time intervals from signals derived from said sampling and for comparing an electrical signal representative of each such computed feed-out rate with the first electrical signal representative, for producing, as a result of said comparison, control electrical signals indicative of the desired changes, if any, in the feed-out rate of the discharge means;

control means for controlling the discharging means in accordance with said control electrical signals to thereby maintain the feed-out of the substance from the container at the desired feed-out rate; and means for comparing a signal derived from at least one sample taken during one of said time intervals with a signal derived from at least one sample taken during another of said time intervals, for repeating said comparison for successive time intervals, so that the signal derived during each of said successive time intervals is compared with a signal derived during a different time interval, and for inhibiting the action of the control electrical signal on the control means when said comparison shows a difference between the compared signals beyond a predetermined limit.

36. A weigh feeding machine according to claim 35, wherein the means for comparing the signals derived from samples taken in different time intervals compares a signal representative of each computed feed-out rate with a signal representative of the computed feed-out rate for the immediately preceding time interval.

* * * * *

Disclaimer 4,320,855.—*Ronald J. Ricciardi*, Garfield; *Angelo Ferrara*, Fairfield; *Joseph L. Hartmann*, West Caldwell and *Gary R. Lauterbach*, Livingston, N.J. WEIGH FEEDING APPARATUS. Patent dated Mar. 23, 1982. Disclaimer filed Jan. 16, 1984, by the assignee, *Acrison, Inc.*

The term of this patent subsequent to Oct. 18, 1994 has been disclaimed.
[*Official Gazette April 3, 1984.*]